(12) United States Patent
Barmatov et al.

(10) Patent No.: US 8,141,637 B2
(45) Date of Patent: Mar. 27, 2012

(54) MANIPULATION OF FLOW UNDERGROUND

(75) Inventors: Evgeny Barmatov, Cambridge (GB); Jill Geddes, Cambridge (GB); Trevor Hughes, Cambridge (GB); Dean Willberg, Tucson, AZ (US); Bruce Mackay, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 195 days.

(21) Appl. No.: 12/539,051

(22) Filed: Aug. 11, 2009

(65) Prior Publication Data

US 2011/0036577 A1 Feb. 17, 2011

(51) Int. Cl.
*E21B 33/138* (2006.01)
*E21B 43/267* (2006.01)

(52) U.S. Cl. .............. 166/280.2; 166/280.1; 166/281; 166/294; 166/300; 175/72; 507/924

(58) Field of Classification Search .............. None
See application file for complete search history.

(56) References Cited

U.S. PATENT DOCUMENTS

| | | | |
|---|---|---|---|
| 3,850,247 A | 11/1974 | Tinsley | |
| 4,600,057 A | 7/1986 | Borchardt | |
| 4,623,783 A | 11/1986 | Kondo | |
| 4,986,354 A | 1/1991 | Cantu et al. | |
| 5,358,051 A | 10/1994 | Rodrigues | |
| 5,439,057 A | 8/1995 | Weaver et al. | |
| 5,680,900 A | 10/1997 | Nguyen et al. | |
| 6,176,537 B1 | 1/2001 | Doshi | |
| 6,725,931 B2 | 4/2004 | Nguyen et al. | |
| 6,774,094 B2 | 8/2004 | Jovancicevic et al. | |
| 6,776,235 B1 | 8/2004 | England | |
| 6,814,145 B2 | 11/2004 | Maberry et al. | |
| 6,834,720 B1 * | 12/2004 | Dwyer et al. ............... 166/289 |
| 7,166,560 B2 | 1/2007 | Still et al. | |
| 7,213,651 B2 | 5/2007 | Brannon et al. | |
| 7,219,731 B2 | 5/2007 | Sullivan et al. | |
| 7,273,104 B2 | 9/2007 | Wilkinson | |
| 7,281,580 B2 | 10/2007 | Parker et al. | |

(Continued)

FOREIGN PATENT DOCUMENTS

WO 9322537 A1 11/1993

(Continued)

OTHER PUBLICATIONS

American Petroleum Institute: "Recommended practices for testing sand used in hydraulic fracturing operations", API Recommended Practice 56, Second Edition, Dec. 1995, pp. 1-12.

(Continued)

*Primary Examiner* — George Suchfield

(57) ABSTRACT

Solid material required at a subterranean location is supplied from the surface suspended in a carrier liquid and agglomerated below ground by means of a binding liquid. To achieve agglomeration, the binding liquid and the particulate solid are similar to each other but opposite to the carrier liquid in hydrophilic/hydrophobic character. The solid and the binding liquid may both be hydrophobic while the carrier liquid is hydrophilic, or vice versa. The solid may be hydrophobically surface modified to render it hydrophobic. The binding liquid may be provided as a precursor which converts to the binding liquid below ground to trigger agglomeration after arrival at the subterranean location. The agglomerates may function as proppant heterogeneously placed in a fracture of a reservoir, or may serve to block an unwanted path of flow. The binding liquid may polymerise after agglomeration so as to stabilise and strengthen the agglomerates.

24 Claims, 6 Drawing Sheets

U.S. PATENT DOCUMENTS

| | | | |
|---|---|---|---|
| 7,281,581 | B2 | 10/2007 | Nguyen et al. |
| 7,287,586 | B2 | 10/2007 | Everett et al. |
| 7,287,588 | B2 | 10/2007 | Zaroslov et al. |
| 7,325,608 | B2 | 2/2008 | van Batenburg et al. |
| 7,331,390 | B2 | 2/2008 | Eoff et al. |
| 7,380,600 | B2 | 6/2008 | Willberg et al. |
| 7,380,601 | B2 | 6/2008 | Willberg et al. |
| 7,392,847 | B2 | 7/2008 | Gatlin et al. |
| 7,461,696 | B2 | 12/2008 | Nguyen et al. |
| 7,484,564 | B2 | 2/2009 | Welton et al. |
| 2005/0028979 | A1 | 2/2005 | Brannon et al. |
| 2005/0274517 | A1 | 12/2005 | Blauch et al. |
| 2006/0048943 | A1 | 3/2006 | Parker et al. |
| 2007/0166541 | A1* | 7/2007 | Smith et al. ........... 428/402 |
| 2008/0135242 | A1* | 6/2008 | Lesko et al. ........... 166/268 |
| 2008/0135245 | A1* | 6/2008 | Smith et al. ........... 166/280.2 |
| 2008/0217010 | A1 | 9/2008 | Blackburn et al. |
| 2010/0089578 | A1* | 4/2010 | Nguyen et al. ........... 166/279 |
| 2010/0193244 | A1* | 8/2010 | Hoskins ........... 175/5 |

FOREIGN PATENT DOCUMENTS

| | | |
|---|---|---|
| WO | 02064945 A1 | 8/2002 |
| WO | 03106809 A1 | 12/2003 |
| WO | 2007086771 A1 | 8/2007 |
| WO | 2008068645 A1 | 6/2008 |
| WO | 2008102122 A1 | 8/2008 |
| WO | 2008131540 A1 | 11/2008 |

OTHER PUBLICATIONS

American Petroleum Institute: "Recommended practices for testing high-strength proppants used in hydraulic fracturing operations", API Recommended Practice 60, Second Edition, Dec. 1995, pp. 1-15.

Arukhe et al: "Solutions for better production in tight gas reservoirs through hydraulic fracturing", 2009 SPE Western Regional Meeting, San Jose, California, USA, Mar. 24-26, 2009, SPE 121357.

Capes et al: "A survey of oil agglomeration in wet fine coal processing", Powder Technology, vol. 40, 1984, pp. 43-52.

Dow Corning Corporation: "Silicone chemistry overview", product information leaflet, pp. 1-11, 1997, form No. 51-960A-97, Dow Corning Corporation, Midland, Michigan 48686-0994.

Drzymala et al: "Air agglomeration of hydrophobic particles", Paper presented at the 34th Annual Conference of Metallurgists, Vancouver, Canada, Aug. 19-24, 1995.

Duchet et al: "Influence of the deposition process on the structure of grafted alkylsilane layers", Langmuir vol. 13, 1997, pp. 2271-2278.

Fox et al: "The spreading of liquids on low energy surfaces. I. Polytetrafluoroethylene", Naval Research Laboratory, Washington DC, Journal of Colloid Science, vol. 5, 1950, pp. 514-531.

Hunter et al: "Effect of esterically bonded agents on the monolayer structure and foamability of nano-silica", Colloids and Surfaces A: Physicochemical and Engineering Aspects, vol. 334, 2009, pp. 181-190.

Kawashima et al: "Some experiments on the effect of contact angle in agglomeration from liquids", Industrial and Engineering Chemistry Fundamentals, vol. 19, 1980, pp. 312-314.

Kundert et al: "Proper evaluation of shale gas reservoirs leads to a more effective hydraulic-fracture stimulation", 2009 SPE Rocky Mountain Petroleum Technology Conference, Denver, Colorado, USA, Apr. 14-16, 2009, SPE 123586.

Kusaka et al: "Two-liquid flotation of fine oxide particles with 8-hydroxyquinoline", The Canadian Journal of Chemical Engineering, vol. 77, Feb. 1999, pp. 62-68.

Laskowski et al: "Oil agglomeration and its effect on beneficiation and filtration of low-rank/oxidized coals", International Journal of Mineral Processing, vol. 58, 2000, pp. 237-252.

Liu et al: "Fundamental study of reactive oily-bubble flotation", Minerals Engineering, vol. 15, 2002, pp. 667-676.

Mehrotra et al: "Review of oil agglomeration techniques for processing of fine coals", International Journal of Mineral Processing, vol. 11, 1983, pp. 175-201.

Owen: "The surface activity of silicones: A short review", Industrial and Engineering Chemistry Product Research and Development, vol. 19, 1980, pp. 97-103.

Owen: "Why silicones behave funny", Dow Corning Corporation, pp. 1-11, 2005, form No. 01-3078-01.

Ozkan: "Determination of the critical surface tension of wetting of minerals treated with surfactants by shear flocculation approach", Journal of Colloid and Interface Science, vol. 277, 2004, pp. 437-442.

Ozkan et al: "Comparison of stages in oil agglomeration process of quartz with sodium oleate in the presence of Ca(II) and Mg(II) ions", Journal of Colloid and Interface Science, vol. 329, 2009, pp. 81-88.

Qun et al: "The study and application of low-damage and massive hydraulic fracturing technique in tight gas formations with high temperature and high pressure", CIPC/SPE Gas Technology Symposium 2008 Joint Conference, Calgary, Alberta, Canada, Jun. 16-18, 2008, SPE 114303.

Rome et al: "Silicone in the oil and gas industry", Dow Corning Corporation, Sep. 2002, ref. No. 26-1139-01.

Rossetti et al: "Rupture energy and wetting behavior of pendular liquid bridges in relation to the spherical agglomeration process", Journal of Colloid and Interface Science, vol. 261, 2003, pp. 161-169.

Silberzan et al: "Silanation of silica surfaces. A new method of constructing pure or mixed monolayers", Langmuir, vol. 7, 1991, pp. 1647-1651.

Starck et al: "Simple method for controlled association of colloidal-particle mixtures using pH-dependent hydrogen bonding", Langmuir, vol. 25, 2009, pp. 2114-2120.

Su et al: "Role of oily bubbles in enhancing bitumen flotation", Minerals Engineering, vol. 19, 2006, pp. 641-650.

Sönmez et al: "Fundamental aspects of spherical oil agglomeration of calcite", Colloids and Surfaces A: Physicochemical and Engineering Aspects, vol. 225, 2003, pp. 111-118.

Wheelock et al: "The role of air in oil agglomeration of coal at a moderate shear rate", Fuel, vol. 73, No. 7, 1994, pp. 1103-1107.

* cited by examiner

MANIPULATION OF FLOW UNDERGROUND

FIELD OF THE INVENTION

The invention relates, broadly, to handling of material below ground. Embodiments of the method of the invention may be used for manipulating a flow path underground. A significant application is as part of a method of hydraulic fracturing of a subterranean reservoir formation with heterogeneous placing of proppant in the fracture so as to achieve high porosity and high fracture conductivity. Another application is as a method of blocking an unwanted flow path, possibly in order to prevent lost circulation, i.e. excessive loss of fluid while drilling. However, the invention also extends to other applications where manipulation of flow paths underground, notably within subterranean reservoirs, is required. It is envisaged that the invention will be used in connection with exploration for, and production of, oil and gas.

BACKGROUND OF THE INVENTION

Placing material at a location below ground may be done in order to enhance flow, notably in the context of hydraulic fracturing, or may be done in order to restrict flow in the context of various operations including plugging, diversion, control of lost circulation and zonal isolation.

Hydraulic fracturing is a well established technique for reservoir stimulation. In normal practice a solid proppant is mixed with the fracturing fluid at the surface and pumped under conditions of very high shear. The proppant-laden fluid then flows down the wellbore under conditions of lower shear. Subsequently it turns and flows out of the wellbore and into the fracture in the formation. Entry to the fracture may be associated with an increase in shear, in particular if the wellbore is cased and the fluid passes through perforations in the wellbore casing to enter the fracture. Once the fluid enters the fracture the fluid is subjected to much less shear. The proppant carried by the fluid becomes packed in the fracture. Subsequently pumping is discontinued, allowing the fracture to close onto the proppant packed in the fracture. Outflow of fluid from the reservoir is allowed to begin, or is restarted, displacing the aqueous fracturing fluid as it does so. The porous pack of proppant in the fracture provides a flow path to the wellbore and so the fracture enhances flow from the reservoir.

It is known to apply a surface treatment to some of the proppant so that the particles of proppant in the pack adhere to one another. This is done in order to minimise the return of proppant particles, especially fines, as liquid flows out of the fracture ("proppant flowback control"). For example U.S. Pat. No. 6,725,931 teaches that a hardenable resin should be applied to all the proppant and should remain tacky after hardening in order to trap any fines passing through the proppant pack. U.S. Pat. No. 7,392,847 teaches an alternative form of surface modification of proppant particles, but again with the objective that the proppant particles in the fracture adhere together.

Whether or not the proppant particles are caused to adhere to one another, the proppant pack needs to be porous to allow outflow of fluid through the proppant pack in the fracture. It is normal practice to employ solid material of controlled particle size distribution in order that the proppant pack has adequate fluid conductivity, i.e. is adequately porous.

It has been appreciated for many years that conductivity through a propped fracture could be enhanced if some way could be found to cluster the proppant at localised areas within the fracture, leaving open pathways or channels for flow between the clusters of proppant (which are sometimes termed "pillars" of proppant). This has come to be referred to as heterogeneous proppant placement. An early document which proposed this is U.S. Pat. No. 3,850,247 published in 1974 which proposed achieving heterogeneous proppant placement by injecting a carrier liquid with proppant particles suspended therein, alternately with a displacement liquid which does not include suspended proppant.

U.S. Pat. No. 6,776,235 teaches sequentially injecting into the wellbore alternate stages of fracturing fluids having a contrast in their ability to transport proppant or having a contrast in the amount of transported proppant. U.S. Pat. No. 7,213,651 also teaches injection of two fracturing fluids alternately.

US published application 2008/0135242 teaches the introduction of a proppant and also a proppant-spacing filler termed a "channelant" which is subsequently removed to leave open channels between islands of proppant.

One circumstance in which it is desired to block a flow path below ground is in addressing the problem of lost circulation. As is well known, when a well is being drilled, the drilling mud is circulated down the drillstring, through the drill bit and back up the surrounding annulus. If the drill penetrates a very porous formation or a formation with cavities, some of the expensive drilling fluid may be lost. There are various approaches to this fluid loss problem and some examples have been disclosed in U.S. Pat. Nos. 5,439,057, 5,680,900, 6,814, 145 and 6,176,537.

It is sometimes desired to block a flow path within a reservoir in order to divert flow elsewhere, to block water entry or to isolate one zone from another. Some examples of approaches to plugging and sealing flow are disclosed in U.S. Pat. Nos. 4,600,057, 5,358,051, 7,331,390 and 7,287,586.

In some circumstances it is desired to block the path of flow within a wellbore. Notably this is done when making multiple fractures of a single well, for example at different depths or at intervals along a horizontal well. A temporary plug can be created with a tool, although the cost of inserting and later removing a tool may be considerable so that placing material in the wellbore to plug may be a more economical option. There are a variety of techniques in this category and some examples have been described in U.S. Pat. Nos. 7,380,600 and 7,273,104.

SUMMARY OF THE INVENTION

The present invention utilises differences in polarity, i.e. differences in hydrophobic/hydrophilic character to bring about agglomeration and it causes that agglomeration to take place underground.

Broadly, an aspect of this invention provides a method of delivering solid material below ground, comprising supplying, below ground, a composition comprising a liquid carrier in which there are suspended droplets of a binding liquid and a particulate solid which is insoluble in both the carrier and binding liquids, the binding liquid and particulate solid being similar to each other but opposite to the carrier in hydrophilic/hydrophobic character such that agglomerates of the solid particles held together by the binding liquid are formed by agglomeration below ground.

The method of this invention may be practised in the context of manipulating a path of flow below ground, possibly to plug an unwanted flow path or possibly to assist in holding a flow path open. The latter notably arises in placing proppant in a fracture to hold it open as a path of flow. Thus an aspect of this invention relates to a method of manipulating the shape of an underground flow path including a step of providing agglomerates as above within that flow path.

The invention may deliver solid material to a subterranean location where the material will serve its intended purpose. Agglomeration may take place in this subterranean location. However, it is possible within this invention that agglomeration may take place or commence in the course of flow below ground towards the subterranean location where the material will serve its purpose.

This subterranean location may be outside a wellbore, within a formation penetrated by that wellbore. In some forms of this invention, the composition is pumped into the well bore and encounters at least one downhole restriction where shear increases, before reaching the subterranean location. For instance, such a restriction may be at a drillbit at the downhole extremity of a drill string, or maybe at the exit from an existing wellbore into a formation, for example at perforations through casing into a reservoir formation. It may be a desirable or advantageous feature of this invention that agglomeration takes place downstream of such a restriction.

Thus, agglomeration may take place after exit from a wellbore into a subterranean formation penetrated by the wellbore. For instance, agglomeration may take place within a hydraulic fracture extending away from a wellbore. However, it is possible that agglomeration will take place, or at least commence, within a wellbore. One possibility is that small agglomerates will form whilst flow is still within the wellbore, but these small agglomerates will join with others to become larger agglomerates after they have moved out of the wellbore and into the formation.

The agglomeration of solid particles by one liquid in the presence of another is a known phenomenon. The agglomeration takes place if there is sufficient similarity in surface polarity between the two constituents which agglomerate, namely the binding liquid and the particulate solid, and also sufficient contrast between both of these and the carrier liquid, so that agglomeration leads to a reduction in the total surface energy of the system. Generally, when all three materials are present together, the contact angle of the binding liquid to the solid surface should be low, while the contact angle of the carrier liquid on the solid is high. The binding liquid then serves to hold the agglomerated solid particles in proximity to each other. The contact angle of the binding liquid on the surface of the solid may be sufficiently low that the binding liquid wets and spreads on the solid surface. The carrier liquid and the binding liquid must of course remain as separate phases when placed in contact with each other.

The binding liquid and the particulate solid may be transported as such in the carrier liquid downwards from the surface to the place where agglomeration occurs. However, it is also possible that one or the other of them will be transported from the surface in the form of a precursor which then undergoes transformation below ground to become the binding liquid or the particulate solid having the required hydrophilic/hydrophobic character.

The carrier fluid may be hydrophilic and indeed may be aqueous, while the solid particles and the binding liquid are both hydrophobic. The inverse arrangement is also possible, however, in which the carrier liquid is hydrophobic while the binding liquid and the solid particles are both hydrophilic.

Whether they are hydrophilic or hydrophobic, the agglomerates which are formed will be made up of the solid particles wetted by the binding liquid and thereby held together by capilliary forces. Since these agglomerates are formed with a liquid as a binding agent it is likely that they will be deformable when they are formed and will remain so unless and until some further change is made to occur. Deformability may be reduced by increasing viscosity of the binding liquid. However, in some forms of this invention, the binding liquid contains at least one reactive chemical so that reaction after the agglomerates have been formed makes them stronger and more rigid.

Forms of this invention provide a method of fracturing a subterranean reservoir formation penetrated by a wellbore, comprising delivering into the fracture a fracturing fluid which serves as a carrier liquid in which there are suspended droplets of a binding liquid which exists as a second liquid phase dispersed within the fracturing fluid, and a particulate solid which is insoluble in both the fracturing fluid and the binding liquid, the binding liquid and the particulate solid being, (or becoming after entry into the wellbore) similar to each other but opposite to the fracturing fluid in hydrophilic/hydrophobic character such that agglomeration of the solid by the binding liquid within the fracture forms agglomerates of the solid particles held together by the binding liquid, the proportions of the binding liquid, the particulate solid and the fracturing fluid being such that the agglomerates are spaced apart within the fracture with flow paths between them. Agglomeration may take place within the fracture or may take place or commence during flow underground to the fracture. The binding liquid, or possibly the particulate solid, may form from a precursor after entry into the wellbore.

In the context of fracturing, the agglomerates of solid particles and binding liquid function as proppant. Agglomeration within the fracture leads to the formation of deformable agglomerates of solid particles and liquid. When the pumping of fluid into the fracture is stopped and the fracture is allowed to close, these agglomerates will be squeezed and flattened out but remain intact, thus achieving heterogeneous placement as islands or pillars of proppant with flow paths between them.

It would also be possible to utilise agglomeration in accordance with this invention to achieve heterogeneous placement, together with the known technique of pumping in different fluids alternately. Thus it would be feasible to pump in a fracturing fluid which contains suspended binding liquid droplets and particulate solid in accordance with this invention, alternately with a fluid which does not contain the binding liquid and particulate solid.

Other forms of the invention may be used to pack a space in a reservoir or to block liquid flow into a formation or to form a plug within a wellbore, in each case using agglomerated solid in order to block a path of flow. In this event, the carrier liquid which is pumped into the reservoir would carry a higher concentration of the particulate solid, together with sufficient binding liquid, with the intention that agglomeration within the reservoir would form a large agglomerated mass.

The carrier liquid may be aqueous or non-aqueous and it may be thickened. Thickening of an aqueous fracturing fluid or other aqueous carrier liquid may be brought about by the commonly used technique of incorporating a thickening polymer. This may be a polysaccharide such as guar, which may be cross-linked to raise viscosity further. Synthetic polymeric thickeners including polyacrylamides and derivatives may also be used.

We have observed that some thickening of the carrier liquid does not prevent agglomeration, although it may be preferred that the viscosity is not allowed to become too high before agglomeration takes place. An aqueous carrier liquid may contain one or more dissolved salts, which would increase the contrast in polarity with a hydrophobic binding liquid.

When the agglomerates are hydrophobic, the dispersed binding liquid will probably have a surface tension against air at 20° C. no greater than 30 mN/m and may be a hydrocarbon. A vegetable oil might possibly be used. A silicone oil such as a non-volatile polydimethylsiloxane would also be a possibility. Although they are somewhat more expensive than hydrocarbon mixtures such as kerosene, silicone oils have the useful property of being very hydrophobic, hence having even lower surface tension. Fluorocarbon oils are also very hydrophobic and would be a further possibility. It is possible that the viscosity of the binding liquid phase might be increased by utilising as the binding liquid an oil thickened with oil-soluble polymer(s) and/or other oil-soluble thickening agents.

In order that there is spontaneous agglomeration, the dispersed binding liquid and the particulate solid must be sufficiently similar in hydrophobicity (or similar in hydrophilicity if the carrier liquid is hydrophobic) that the binding liquid selectively wets the solid when they are both submerged within the carrier liquid. A sufficiently hydrophobic particulate solid may be a material which is inherently hydrophobic or it may be a material to which a surface treatment has been applied in order to make it more hydrophobic (or where appropriate more hydrophilic) in order that agglomeration occurs.

Rubber is an example of a material which is inherently hydrophobic. We have found that this can be agglomerated using a hydrophobic oil as binding liquid. A possibility within this invention is to use comminuted waste rubber as the particulate solid especially when seeking to plug an aperture.

Sand is frequently used as proppant in conventional fracturing. Ordinary silica sand is not agglomerated by oil in the presence of water. By contrast, we have found that sand which has been treated to make it more hydrophobic will spontaneously agglomerate in the presence of oil. One combination of materials which may be preferred for putting this invention into effect is a combination of an aqueous carrier liquid, a hydrophobic dispersed binding liquid and hydrophobically modified sand as the particulate solid. It is also possible that a hydrophobically modified solid might be used in a mixture with a solid which is inherently hydrophobic. (Whilst hydrophobic agglomerates are mentioned here, it should not be overlooked that the invention can also be put into effect with a non-aqueous hydrophobic carrier liquid, a hydrophilic dispersed binding liquid and a hydrophilic particulate solid).

Some commercially available proppants consist of sand which has been given an organic surface coating (commonly referred to as "resin-coated proppants"). Such a coating may be capable of polymerisation downhole and may be applied with the intention that the proppant particles in a conventional proppant pack become attached together after they have been pushed together in the fracture. This technique has been employed to inhibit flow back of fine particles after fracturing. We have found that some, but by no means all, commercial materials of this kind can be agglomerated from aqueous suspension by contacting them with oil. It appears that some of the organic coatings used commercially to make materials in this category are sufficiently polar that the coated particles are too hydrophilic to be agglomerated from aqueous suspension.

A quantitative indication of the surface polarity of a solid (prepared with a smooth, flat surface) is the concept of critical surface tension pioneered by Zisman (see Fox and Zisman J. Colloid Science Vol 5 (1950) pp 514-531 at page 529). It is a value of surface tension such that liquids having a surface tension against air which is lower than or equal to this value will spread on the surface of the solid whereas those of higher surface tension will remain as droplets on the surface, having a contact angle which is greater than zero. A strongly hydrophobic solid has a low critical surface tension. For instance the literature quotes a critical surface tension for polytetrafluoroethylene (PTFE) of 18.5 mN/m and for a solid coated with heptadecafluoro-1,1,2,2-tetra-hydro-decyl-trichlorosilane the literature value of critical surface tension is 12 mN/m. By contrast the literature values of critical surface tension for soda-lime glass and for silica are 47 and 78 mN/m respectively.

We have found that an analogous measurement of the hydrophobicity of the surface of a particulate solid can be made by shaking the solid with a very hydrophobic oil (preferably a silicone oil) having a low surface tension and mixtures of ethanol and water with a progressively increasing proportion of ethanol. This may be done at a room temperature of 20° C. The surface tensions of a number of ethanol and water mixtures are tabulated in CRC Handbook of Chemistry and Physics, $86^{th}$ edition, section 6 page 131.

Increasing the proportion of ethanol in the aqueous phase (i.e. the ethanol and water mixture) reduces its surface tension. Eventually a point is reached when the surface tension of the aqueous phase is so low that the solid can no longer be agglomerated by the oil. The boundary value at which agglomeration by the oil ceases to occur is a measure of the hydrophobicity of the solid and will be referred to as its "agglomeration limit surface tension" or ALST.

We have observed that particulate solids which can undergo spontaneous aggregation from suspension in deionised water on contact with oil always display an ALST value of approximately 40 mN/m or less. This ALST test covers a range of values of practical interest, but it should be appreciated that if no agglomeration takes place, this test does not give a numerical ALST value, but demonstrates that the surface does not have an ALST value of 40 mN/m or less. Moreover, if the surface has an ALST value below the surface tension of pure ethanol (22.4 mN/m at 20° C.), this test will not give a numerical ALST value but will show that the ALST value is not above 22.4 mN/m.

We have also observed that particulate solids which are very hydrophobic (with an ALST value substantially below the 40 mN/m boundary) form tight agglomerates with the solid particles closely packed together, whereas solids which are only just sufficiently hydrophobic to be agglomerated by a hydrophobic oil tend to form loose agglomerates characterised by a high volume fraction of oil within them and the solid particles lying at the oil-water interface. Consequently, for this invention it may be desirable when the agglomerates are hydrophobic and the carrier fluid is aqueous that the ALST of the particulate solid is no greater than 38 mN/m possibly no greater than 35 mN/m.

When the solids to be agglomerated are not inherently hydrophobic, a range of different methods can be used to modify the surface of solid particles to become more hydrophobic—these include the following, in which the first three methods provide covalent bonding of the coating to the substrate.

1. Organo-silanes can be used to attach hydrophobic organo-groups to hydroxyl-functionalised mineral substrates such as proppants composed of silica, silicates and alumino-silicates. The use of organosilanes with one or more functional groups (for example amino, epoxy, acyloxy, ethoxy or chloro) to apply a hydrophobic organic layer to silica is well known. The reaction may be carried out in an organic solvent or in the vapour phase (see for example Duchet et al, Langmuir (1997) vol 13 pp 2271-78).

2. Organo-titanates and organo-zirconates such as disclosed in U.S. Pat. No. 4,623,783 can also be used. The literature indicates that organo-titanates can be used to modify minerals without surface hydroxyl groups, which could extend the range of materials to undergo surface modification, for instance to include carbonates and sulphates.

3. A polycondensation process can be used to apply a polysiloxane coating containing organo-functionalised ligand groups of general formula P—(CH2)3-X where P is a three-dimensional silica-like network and X is an organo-functional group. The process involves hydrolytic polycondensation of a tetraalkoxysilane Si(OR)4 and a trialkoxy silane (RO)3Si(CH2)3X. Such coatings have the advantage that they can be prepared with different molar ratios of Si(OR)4 and (RO)3Si(CH2)3X providing "tunable" control of the hydrophobicity of the treated surface.

4. A fluidised bed coating process can be used to apply a hydrophobic coating to a particulate solid substrate. The coating material would typically be applied as a solution in an organic solvent and the solvent then evaporated within the fluidised bed.

5. Adsorption methods can be used to attach a hydrophobic coating on a mineral substrate. A surfactant monolayer can be used to change the wettability of a mineral surface from water-wet to oil-wet. Hydrophobically modified polymers can also be attached by adsorption.

6. A waxy coating can be used to render a mineral substrate hydrophobic. Typically, the wax is applied at a temperature above its melting point and subsequent cooling forms a competent hydrophobic coating.

The particulate solid must of course form a separate solid phase when the agglomeration takes place. At this time it must therefore be insoluble in the carrier and binding liquids, or at least be of low solubility in them. For some applications of this invention it will be desirable that the particulate solid remains insoluble after agglomeration has taken place. However, it is within the scope of some forms of this invention that the agglomerated solid might not have a permanent existence and might in time become dissolved in fluid around it. For instance, incorporation of hydrophobically modified calcium carbonate within a mixed agglomerate with hm-silica would lead to agglomerates which could be partially dissolved by subsequent flow of an acidic solution.

The solid particles used in this invention may vary considerably in shape and size. They may have irregular shapes typical of sand grains and crushed minerals which can be loosely described as "more spherical than elongate" where the aspect ratio between the longest dimension and the shortest dimension orthogonal to it might be 5 or less. In general, median particle sizes are unlikely to be larger than 5 mm. Median particle sizes are more likely to be 3 mm or less and preferably are 1.6 mm or less. Embodiments of this invention may use mixtures of solid particles where the median particle size is less than 1 mm.

Particle sizes may conveniently be specified by reference to sieve sizes, as is customary for proppant materials. American Petroleum Institute Recommended Practices (API RP) standards 56 and 60 specify a number of proppant sizes by stating upper and lower US Sieve sizes. 90 wt % of a sample should pass the larger sieve but be retained on the smaller sieve. Thus '20/40 sand' specifies sand having a particle size distribution such that 90 wt % of it passes 20 mesh (840 micron) but is retained on 40 mesh (420 micron). Correspondingly 90 wt % of a sample of 70/140 sand, which is the smallest size recognized by these standards, passes a 70 mesh (210 micron) sieve but is retained on a 140 mesh (105 micron) sieve. It will be appreciated that for any proppant specified by upper and lower sieve sizes, the median and mean particle sizes fall somewhere between the upper and lower sieve sizes.

Another method for determining size of particles is the commonly used technique of low angle laser light scattering, more commonly known as laser diffraction. Instruments for carrying out this technique are available from a number of suppliers including Malvern Instruments Ltd., Malvern, UK. The Malvern Mastersizer is a well known instrument which determines the volumes of individual particles, from which mean and median particle size can be calculated using computer software which accompanies the instrument. When determining particle sizes using such an instrument, the size of an individual particle may be taken as the diameter of a spherical particle of the same volume, the so-called "equivalent sphere". Volume median diameter denoted as D[v,05] or $d_{50}$ is a value of particle size such that 50% (by volume) of the particles have a volume larger than the volume of a sphere of diameter $d_{50}$ and 50% of the particles have a volume smaller than the volume of a sphere of diameter $d_{50}$.

Particle size distribution is then conveniently indicated by the values of $d_{10}$ and $d_{90}$ measured in the same way. 10% by volume of the particles in a sample have an equivalent diameter smaller than $d_{10}$. 90% by number are smaller than $d_{90}$ and so 10% by volume are larger than $d_{90}$. The closer together the values of $d_{10}$ and $d_{90}$, the narrower is the particle size distribution.

In forms of this invention where the particulate solid is a proppant for hydraulic fractures, the particles may have a $d_{90}$ upper size similar to that of conventional proppant, such as 10 mesh (2 mm) or 20 mesh (840 microns). In conventional fracturing where the fracture is packed with proppant, it is normal to use proppant with specified particle size range and a specified minimum size (eg 20/40 sand) in order that the proppant pack will be porous. By contrast, the present invention does not need spaces between individual solid particles. In forms of this invention which relate to fracturing, the flow paths go around the agglomerates, not through them. Indeed, flow through the agglomerates is blocked by the binding liquid. The particulate solid may therefore have a smaller particle size and/or a wider size distribution than required for conventional proppant. The smaller particles of the distribution will tend to fit into the interstices between larger particles, enhancing the strength of the agglomerates and also reducing the interstitial volume which is bridged by binding liquid which thus also reduces the amount of binding liquid required. For the same reasons, the particulate solid may also have a broad size range in forms of this invention where the agglomerates serve to block a path of flow.

Consequently, in forms of this invention concerned with hydraulic fracturing, it is likely that the particle size properties of the particulate solid will be such that $d_{50}$>110 micron, possibly >120 micron $d_{50}$>1 mm $d_{90}$<3 mm, possibly <2 mm The particle size distribution may be sufficiently wide that $d_{90}$ is more than 5 times $d_{10}$, possibly more than 10 times $d_{10}$. These particle size properties may also apply to other forms of this invention, such as those where the method of the invention is applied to preventing lost circulation, or achieving isolation of one zone from another.

It is also possible that the particulate solid consists of, or includes, elongate fibres. Including fibres in the agglomerated solid may lead to agglomerates which are resistant to change in shape after agglomeration. For fibres, as for other solids, it is preferred that the ALST value does not exceed 38 mN/m. An example of hydrophobic fibres which could be used alone or mixed with other particulate solid is polypropylene fibres having median diameter in a range from 50 to 500 micron and a median length of 3 to 10 mm. Another example would be glass fibres of these dimensions modified with a hydrophobic surface layer.

A composition for use in the method of this invention, containing carrier liquid, binding liquid and particulate solid to be agglomerated by the binding liquid may also incorporate other materials and additives, if these do not prevent the intended agglomeration. It is possible, for instance, that the composition could include some solid material which does not agglomerate. Thus, an aqueous carrier liquid could carry hydrophobic binder liquid, hydrophobic fibres to be agglomerated and also some other solid which is hydrophilic and is not agglomerated.

In this invention the particulate solid is agglomerated by the dispersed binding liquid at a subterranean location. Materials must be transported to this location and it will generally be necessary to provide some way to avoid or inhibit agglomeration during transit but then permit or induce agglomeration on arrival within the subterranean reservoir. There are a number of ways in which this can be done and these will be discussed in turn.

Physical Separation of Flow.

The binding liquid and particulate solid components of the agglomerates are delivered by separate flow paths within a wellbore. This can be achieved by using coiled tubing within a wellbore to deliver one of the two components while using the annulus around the coiled tubing as the flow path for the other of the two components. For instance, a suspension of the binding liquid in the carrier liquid might be pumped through coiled tubing to the point at which the materials pass from the wellbore into the reservoir while a suspension of the particulate solid in carrier liquid is pumped through the annulus around the coiled tubing. It is possible that the concentration of binding liquid might then be cycled between higher and lower (or zero) concentrations in order to promote the formation of discreet agglomerates for heterogeneous proppant placement.

Sensitivity to Temperature.

This approach makes use of the difference between surface temperatures and temperatures below ground, which are almost always higher than at the surface. During transit to the subterranean location, the carrier liquid and everything suspended in it will pass through a wellbore exposed to subterranean temperatures and will begin to heat up, but if the flow rate is substantial, the flowing composition will reach the subterranean location at a temperature well below the natural temperature at that location. In particular, in the case of hydraulic fracturing the fracturing fluid will leave the wellbore and enter the fracture at a temperature significantly below the reservoir temperature.

One way to make use of this temperature difference is to employ as binding liquid a substance which is solid at surface temperature but which melts to a liquid at the downhole temperature. One example of such a material is eicosane which melts at 35 to 37° C. Various grades of paraffin wax, melting at temperatures from 35 to 60° C., are available commercially. It is envisaged that the solid wax could be blended with the particulate solid and pumped in as a suspension in aqueous carrier liquid. Higher and lower (or zero) concentrations of the wax in the carrier liquid could be pumped alternately in order to promote the formation of discreet agglomerates for heterogeneous proppant placement.

Encapsulation.

Encapsulation of either the binding liquid or the particulate solid to delay release and prevent them from contacting each other prematurely could also be carried out with an encapsulating material which dissolves slowly or undergoes chemical degradation under conditions encountered at the subterranean location, thereby leading to rupture of the encapsulating shell or making the encapsulating material permeable. Degradation may in particular be hydrolysis which de-polymerises an encapsulating polymer. While such hydrolytic degradation may commence before the overall composition has travelled down the wellbore to the reservoir, it will provide a delay before significant amounts of binding liquid or particulate solid contact each other.

A number of technologies are known for the encapsulation of one material within another material. Polymeric materials have frequently been used as the encapsulating material. Some examples of documents which describe encapsulation procedures are U.S. Pat. No. 4,986,354, WO 93/22537, and WO 03/106809. Encapsulation can lead to particles in which the encapsulated substance is distributed as a plurality of small islands surrounded by a continuous matrix of the encapsulating material. Alternatively encapsulation can lead to core-shell type particles in which a core of the encapsulated substance is enclosed within a shell of the encapsulating material. Both core-shell and islands-in-matrix type encapsulation may be used.

An encapsulating organic polymer which undergoes chemical degradation may have a polymer chain which incorporates chemical bonds which are labile to reaction, especially hydrolysis, leading to cleavage of the polymer chain. A number of chemical groups have been proposed as providing bonds which can be broken, including ester, acetal and amide groups. Cleavable groups which are particularly envisaged are ester and amide groups both of which provide bonds which can be broken by a hydrolysis reaction.

Generally, their rate of cleavage in aqueous solution is dependent upon the pH of the solution and its temperature. The hydrolysis rate of an ester group is faster under acid or alkaline conditions than neutral conditions. For an amide group, the decomposition rate is at a maximum under low pH (acidic) conditions. Low pH, that is to say acidic, conditions can also be used to cleave acetal groups.

Thus, choice of encapsulating polymer in relation to the pH which will be encountered after the particles have been placed at intended subterranean location may provide a control over the delay before the encapsulated material is released. Polymers which are envisaged for use in encapsulation include polymers of hydroxyacids, such as polylactic acid and polyglycolic acid. Hydrolysis liberates carboxylic acid groups, making the composition more acidic. This lowers the pH which in turn accelerates the rate of hydrolysis. Thus the hydrolytic degradation of these polymers begins somewhat slowly but then accelerates towards completion and release of the encapsulated material. Another possibility is that a polymer containing hydrolytically cleavable bonds may be a block copolymer with the blocks joined through ester or amide bonds. One possibility for making use of chemical degradation to delay agglomeration would be to coat a hydrophobic particulate solid with a degradable coating. The coating would need to be hydrophilic in order to prevent agglomeration. Degradation of the coating would expose the hydrophobic solid inside and allow agglomeration to proceed.

Another possibility would be to apply a degradable coating to particles of a substance which is solid at surface temperature but which subsequently melts to become a binding liquid at downhole temperatures. The solid state at the surface would facilitate application of such an encapsulating coating. Availability of the binding liquid would then be delayed until degradation of the coating and exposure to downhole temperature have both taken place.

Precursor Converts to Binding Liquid.

One approach to delaying the agglomeration and so providing time for transport to a subterranean location before agglomeration takes place, is to transport binding liquid in the form of a precursor and induce it to transform from the precursor to the binding liquid below ground. This may be done by using a long chain carboxylic acid as the binding liquid, transporting it at a pH above the $pK_a$ of the acid so that it is in the form of an ionised salt, and then lowering the pH after a delay.

Suitable monocarboxylic acids may have the formula RCOOH where R is a saturated or partially unsaturated aliphatic carbon chain of at least 8 carbon atoms. Possibly R has a chain length of 8 or 12 carbon atoms up to 24 carbon atoms. Also suitable are dimeric and oligomeric carboxylic acids based on linked surfactant monomer subunits, each monomer subunit having the formula $R_a$COOH where $R_a$ is a $C_{10}$-$C_{50}$ aliphatic group comprising a $C_{10}$-$C_{25}$ aliphatic chain and the $R_a$ groups of the monomer subunits are connected together to form the dimeric or oligomeric acid. These dimeric and oligomeric acids would provide a very viscous binding liquid. Some structures of dimeric, trimeric and oligomeric fatty acids are shown in U.S. Pat. No. 6,774,094.

If these carboxylic acids contain an aliphatic chain of sufficient length, generally of at least 16 or 18 carbon atoms, they are able to act as viscoelastic surfactants when the pH is above their $pK_a$ values so that the surfactants are in ionised form. (A discussion of viscoelastic surfactants can be found in WO2008/102122 for example) In order to obtain viscoelastic behaviour it may be necessary that the solution also contains some added salts such as potassium chloride (KCl). Incorporating such carboxylic acids, when in the form of viscoelastic surfactants at pH above their pKa values and in the presence of a salt will have the effect of thickening the carrier liquid. After a carrier liquid containing a carboxylate has been transported downhole to a subterranean location, it will be necessary to reduce pH to below the $pK_a$ value of the acid. One possibility for this would be to pump in an acid solution alternately with the carrier liquid and allowing them to mix. However, a preferred way to reduce pH with a delay is to include particles or fibres of a poly(hydroxyacid) such as polylactic acid or polyglycoolic acid in the composition transported down the wellbore. The polymer will hydrolyse on contact with the aqueous carrier liquid as described above, liberating the carboxylic acid groups of the monomeric acid and thus lowering the pH of the solution. (Fibres and other particles of polyhydroxy acids are described in several documents including U.S. Pat. Nos. 7,380,601, 7,166,560 and 7,219,731, for example).

Using a precursor which is a viscoelastic surfactant is advantageous in some contexts of this invention, notably hydraulic fracturing, where it is desirable that the carrier liquid is a thickened aqueous fluid but it is also desirable that it loses viscosity after the proppant has been transported into the fracture. Lowering the pH when the composition has been delivered to the fracture or other subterranean location will take away the viscoelastic property of the precursor at the same time as converting it from a viscoelastic surfactant into the required binding liquid.

Another category of precursor capable of hydrolysis to form a hydrophobic binding liquid is a molecule including the partial formula

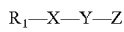

where $R_1$ is a long chain aliphatic group and X is a cleavable group such as an ester, amide or acetal group cleavable by hydrolysis. Such a precursor compound may be a cleavable surfactant (such as described in WO2002/064945) having a structure $$R_1—X—Y—Z$$

where (i) $R_1$ is a saturated or unsaturated, linear or branched aliphatic chain of at least 8 carbon atoms, preferably at least 12 carbon atoms;

(ii) X is a cleavable group such as an O(CO), (CO)O, $R_7$N(CO), or (CO)N$R_7$ group;

(iii) Y is a spacer group which is constituted by a short saturated or unsaturated hydrocarbon chain comprising at least one carbon atom, preferably at least 2 but not more than 6 carbon atoms and which may optionally be a branched if the number of carbon atoms is sufficient for a branched chain;

(iv) Z is a hydrophilic head group which may be:
a cationic group of the formula —N$^+$R$_2$R$_3$R$_4$;
a sulfonate or carboxylate anionic group: or
an amphoteric group of the formula —N$^+$R$_2$R$_3$R$_4$—COO$^-$; and (v) $R_2$, $R_3$, $R_4$ and $R_7$ are each independently hydrogen; a linear or branched, saturated aliphatic chain of at least 1 carbon atom; or a linear or branched, saturated aliphatic chain of at least 1 carbon atom with one or more of the hydrogen atoms replaced by a hydroxyl group.

A further possibility for a precursor of a binding liquid is an ionic complex formed between a polymer with multiple positive charges and negatively charged carboxylate ions. When pH is reduced the carboxylate ions will be converted to the un-ionised carboxylic acid which will then be able to serve as binding liquid.

Emulsified Binding Liquid.

Yet another approach to delaying agglomeration is to emulsify the binding liquid in the carrier liquid, thereby inhibiting interaction of the binding liquid with the particulate solid, and then break the emulsion after transport to the downhole location.

This approach may be implemented by forming an emulsion with an emulsifier which undergoes hydrolytic degradation. For example, a surfactant which includes a degradable ester, amide or acetal group could be used as the emulsifier.

The agglomerates which form consist of the solid particles clustered together, with binding liquid in the spaces between particles. The amount of binding liquid may or may not be sufficient to fill completely the spaces between the solid particles in the agglomerates.

We have observed that the ratio of binding liquid to solid particles affects the equilibrium size of the agglomerates which form. As the proportion of binding liquid is increased from zero, the equilibrium size of the agglomerates increases until the proportion of binding liquid approaches the amount (which can be calculated) needed to fill the spaces between randomly close packed particles in a large agglomerate.

If the amount of binding liquid is increased still further the excess liquid may remain separate from the agglomerates, although a limited excess of binding liquid has been observed to remain in contact with agglomerated particles even though less dense than the carrier liquid.

If the particulate solid or a hydrophobic coating on that solid is temperature-sensitive, increasing temperature may disrupt the agglomerates. However, if the materials are individually stable, increasing temperature has not been observed to disrupt the agglomerates. On the contrary, the equilibrium agglomerate size has been observed to increase. In some applications of the invention this stability against temperature is an advantage.

In a development of this invention, the binding liquid consists of, or includes, one or more chemicals which react after the agglomerates have formed. The reaction may be a polymerisation reaction serving to raise the viscosity of the binder liquid within the agglomerates or to harden it to a point where it is no longer able to flow, thus stabilising the agglomerates against deformation or destruction.

Materials which may be used for this purpose include di-isocyanates which can polymerise and combinations of di-isocyanates and polyhydroxy compounds which polymerise together to form polyurethanes. Di-isocyanates may also be used in combination with polyamines. Prepolymers capable of further polymerisation may be used, e.g prepolymers of urethane resins, polyepoxide resins, phenol-aldehyde resins, urea-aldehyde resins, phenolic resins, furan resins, acrylates, methacrylates, novolak resins, and combinations thereof. Other possible reactive materials are organic compounds with olefinic groups which can be polymerised or crosslinked. For instance the binding liquid could be a hydrophobic oil with a polybutadiene, a crosslinking agent and a free radical initiator dissolved in it, for the polybutadiene to undergo further polymerisation and crosslinking at the temperature encountered below ground. A somewhat similar possibility is for the binding liquid to include a silicone compound with reactive functional groups, such as an acrylate endblocked polydimethylsiloxane, which can undergo further polymerization.

A further possibility for reaction after the formation of agglomerates would be to utilise a particulate solid which had been hydrophobically modified with a silicone compound which incorporates a reactive functional group, such as a vinyl or epoxy group, and then include in the binder liquid a material which is both polymerisable and able to react with the functional groups on the hydrophobic coating. For example hydrophobic modification could be carried out using oleyl trichlorosilane and the binding liquid could include an acrylate endblocked polydimethylsiloxane and a free radical initiator.

When reaction is intended to take place after agglomeration, it may be desirable to employ two binding liquids which can react together. In this event separate flow paths might be provided within the wellbore. One flow path, perhaps the interior of coiled tubing, could convey carrier liquid, particulate solid and binding liquid. A second flow path, perhaps the annulus around coiled tubing, could convey a carrier liquid, particulate solid and a second binding liquid. The two flows mix downhole and flow out into the formation. Agglomerates which form contain both binding liquids. These mix and react together forming a polymeric matrix within the agglomerates, thus stabilizing and strengthening the agglomerates against deformation and/or break-up.

It is possible that some agglomeration could take place within these paths of flow before the binding liquids are able to mix together. In this event the binding liquids could still mix together and react as the agglomerates formed within the wellbore mix together and reform or agglomerate further.

A further possibility, which will be useful in some applications, notably when forming temporary plugs, is to utilise a binding liquid which is degradable, so that the agglomerates have a limited lifetime. Examples of such liquids include oily esters of di-acids such as dimethyl glutarate, dimethyl succinate, and dimethyl adipate. Another way to form temporary plugs would be to form agglomerates with a hydrophobic binding liquid and subsequently destabilise the agglomerates by contacting them with a solvent which acts as a hydrotrope, such as a lower alcohol, or with a surfactant solution.

We have observed that hydrophobic agglomerates will cling to a larger hydrophobic surface. This provides a route to forming a plug at a specified location by first providing a hydrophobic surface such as a piece of polytetrafluoroethylene (ptfe) or a piece of rubber at the location concerned and then inducing agglomeration of a hydrophobic particulate solid and a hydrophobic binding liquid in accordance with the invention in the vicinity of a hydrophobic surface. The agglomerates which form will initially cling to that surface and then further agglomerates will cling to these so that a plug forms at the location where the hydrophobic surface was provided.

DETAILED DESCRIPTION AND EXAMPLES

Example 1A

Hydrophobic Modification of Sand

Figure 1:
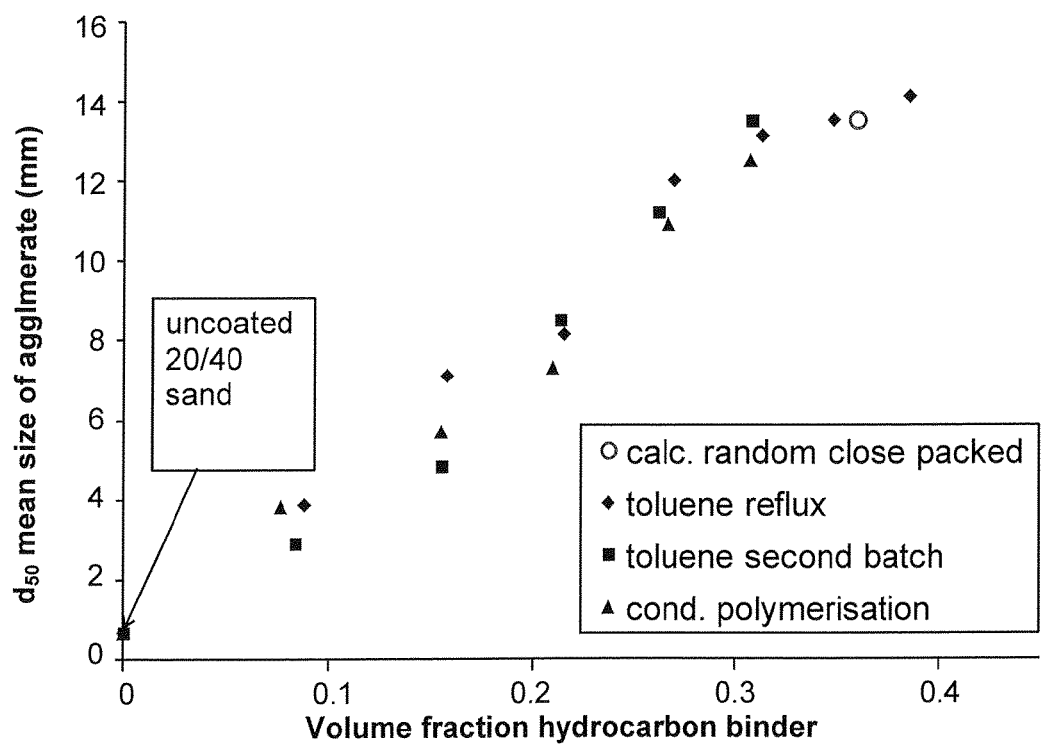
FIG. 1 plots average agglomerate sizes against volume fraction of binding liquid.

Sand, having particle size between 20 and 40 US mesh (840 micron and 400 micron), i.e. 20/40 sand, was washed by mixing with ethanol at ambient temperature, then filtering, washing with deionised water and drying overnight at 80° C.

Quantities of this pre-washed sand were hydrophobically modified by treatment with various reactive organosilanes, using the following procedure. 75 gm pre-washed sand was added to a mixture of 200 ml toluene, 4 ml organo-silane and 2 ml triethylamine in 500 ml round bottomed flask. The mixture was refluxed under a nitrogen atmosphere for 4 to 6 hours. After cooling, the hydrophobically modified sand (hm-sand) was filtered off (on a Whatman glass microfiber GF-A filter) and then washed, first with 200 ml toluene, then 200 ml ethanol and then 800 ml deionised water. The hm-sand was then dried overnight at 80° C.

The above procedure was carried out using each of the following four reactive organo-silanes:

5.64 gm Heptadecafluoro-1,1,2,2-tetrahydro-decyl-triethoxysilane (>95% purity, specific gravity=1.41 gm/ml).

5.40 gm Tridecafluoro-1,1,2,2-tetrahydro-octyl-triethoxysilane (>95% purity, specific gravity=1.35 gm/ml).

3.53 gm Octadecyl-trimethoxysilane (90% purity, specific gravity=0.883 gm/ml).

5.93 gm Octadecyldimethyl 3-trimethoxysilylpropyl ammonium chloride (60% active solution in in methanol, specific gravity=0.89 gm/ml).

For convenience the hydrophobic groups introduced by these materials will be referred to as hereafter as $C_{10}F_{17}H_4$-silyl, $C_8F_{13}H_4$ silyl, $C_{18}H_{37}$-silyl and $C_{18}H_{37}$aminopropylsilyl, respectively.

It was appreciated that these quantities of organo-silane were far in excess of the stoichiometric amount required to react with all the hydroxyl groups on the surface of the sand particles. 20/40 sand has specific surface area 0.0092 m²/gm (calculated from particle size distribution determined by laser diffraction (Malvern Mastersizer) method). The theoretical maximum concentration of hydroxyl (—OH) groups per unit area of silica surface, is 4.5 hydroxyl groups per square nanometer. From these values it can be calculated that 75 gm sand has (at most) $3.1 \times 10^{18}$ hydroxyl groups exposed on its surface. Using Avogadro's number, 5.64 gm (0.00924 mol) heptadecafluoro-1,1,2,2-tetra-hydro-decyl-triethoxysilane contains $5.56 \times 10^{21}$ molecules. Therefore there is a very high ratio of organo-silane molecules in the reaction solution to surface hydroxyl groups. The calculated number ratio in the case of the $C_{10}F_{17}H_4$-silyl example above was organo-silane$_{(solution)}$/OH$_{(surface)}$=1792. It should be noted that excess oprganosilane is removed from the treated sand during the filtration and washing stages.

Example 1B

In additional experiments the procedure above was carried out with the following reduced quantities of organo-silane:

0.27 gm Heptadecafluoro-1,1,2,2-tetra-hydro-decyl-triethoxysilane number ratio organo-silane$_{(solution)}$/OH$_{(surface)}$=85.8.

0.02 gm Heptadecafluoro-1,1,2,2-tetra-hydro-decyl-triethoxysilane number ratio organo-silane$_{(solution)}$/OH$_{(surface)}$=6.4.

As shown by results tabulated in Example 7 below, the smallest amount of organo-silane was insufficient to render the sand adequately hydrophobic.

Example 2

Demonstration of Agglomeration 3 gm of sand, hydrophobically modified with $C_{10}F_{17}H_4$-silyl groups as in Example 1A, was placed in a bottle containing 20 ml deionised water. As a control, 3 gm of unmodified sand was placed in a second bottle, also containing 20 ml deionised water.

Each bottle was shaken vigorously and then left to stand. The unmodified sand in the control bottle was observed to settle to a layer at the base of the bottle. The hydrophobically modified sand settled to an uneven layer at the base of its bottle. 1 ml hexadecane was added to each bottle and the bottles were shaken again (this was done at 22° C. which is slightly above the melting point of hexadecane) The sand in the control bottle settled as before to a layer at the bottom of the bottle. The hydrophobically modified sand formed a single agglomerated mass at the bottom of its bottle. This mass had a fairly smooth rounded shape. When the bottle was turned to lie on its side the agglomerated mass stayed together and did not spread out sufficiently to cover the lowest part of the bottle. This experiment was repeated using dodecane in place of hexadecane, with a very similar result.

This experiment was also repeated using 2 ml and 3 ml hexadecane. This was observed to provide an excess of binding liquid compared to the minimum amount required to bring about agglomeration of all the solid into a single agglomerate. Some of the excess hexadecane was seen to remain submerged under water, lying on top of the agglomerated mass at the bottom of the bottle.

Example 3

Demonstration of Agglomeration 3 gm quantities of 20/40 sand, hydrophobically modified with $C_{18}H_{37}$-silyl groups by the procedure of Example 1A, were placed in bottles containing 20 ml deionised water. 1 ml hexadecane was added to one bottle and 2 ml hexadecane was added to a second bottle. The bottles were shaken and in both cases the sand agglomerated to a rounded mass which stayed together and did not spread over the lowest surface of the bottle. This experiment was repeated using sand which had been hydrophobically modified with $C_8F_{13}H_4$ silyl groups. Similar agglomeration was observed.

Example 4

Condensation Coating

Pre-washed 20/40 sand was given a hydrophobic surface coating by the simultaneous condensation polymerization of tetraethylorthosilicate (TEOS) and tridecafluoro-1,1,2,2-tetrahydro-octyl-triethoxysilane in 3:1 molar ratio under basic conditions.

200 gm pre-washed sand, 12 ml of aqueous ammonia (NH$_4$OH, 28%), 57 ml of absolute ethanol and 3 ml deionized water were mixed and stirred vigorously (Heidolph mechanical stirrer at 300-400 RPM) for 30 min. Then 0.73 gm (3.53 mmol) of TEOS and 0.6 gm (1.17 mmol) tridecafluoro-1,1,2,2-tetrahydro-octyl-triethoxysilane were added and stirred for 3.5 hrs at room temperature. The resulting hm-sand was then filtered off, washed with ethanol and then with deionized water and dried at 120° C. overnight.

This procedure was also carried out using pre-washed 70/140 sand and was furthermore carried out using a mixture of tetraethylorthosilicate (TEOS) and heptadecafluoro-1,1,2,2-tetra-hydro-decyl-triethoxysilane and a mixture of tetraethylorthosilicate (TEOS) and octadecyl-trimethoxysilane.

Example 5

Polymer Coating

Quantities of pre-washed sand (both 20/40 and 70/140) were given a surface coating of polymer by the following procedure. A quantity of polymer was dissolved in 20 ml dichloromethane (DCM). The polymer/DCM solution was added to 200 gm pre-washed sand in a 200 ml beaker. The mixture was then stirred (Heidolph mechanical stirrer at 20-100 RPM) for approx. 10 min in a fume hood; during this period the DCM evaporated, depositing the polymer as a coating on the surface of the sand. The resulting coated sand was dried at room temperature overnight.

This polymer coating procedure was carried out using polystyrene (PS) of mean molecular weight 35,000 and polymethylmethacrylate (PMMA) with various mean molecular weights. The amounts of polymer were 0.15 or 0.5 wt % by weight of the sand. The properties of the PS and PMMA polymers and the characteristics of the sand substrates are detailed in the following Table.

| Polymer content, wt. % | Substrate | Polymer | Mw | Tg*, ° C. |
|---|---|---|---|---|
| 0.5 | 20/40 sand | PS | 35,000 | 67 |
| 0.15 | 70/140 sand | PS | 35,000 | 67 |
| 0.15 | 20/40 sand | PMMA | 350,000 | 128 |
| 0.15 | 20/40 sand | PMMA | 15,000 | 94 |
| 0.15 | 70/140 sand | PMMA | 996,000 | 127 |

*Glass transition temperature.

Example 6A

Varying Volume Fraction of Binding Liquid 2 gm quantities of 20/40 sand, hydrophobically modified with $C_{10}F_{17}H_4$-silyl groups as in Example 1A, were placed in sample bottles together with 20 ml deionised water and varying amounts of dodecane. The bottles were shaken vigorously for one minute and then left overnight to equilibrate. The mean sizes of the agglomerates which formed in each bottle were estimated by measurement on photographs of the sample bottle laid alongside a graduated scale. This procedure was repeated with samples from a second batch of similar sand, modified in the same way, and with samples of 20/40 sand given a hydrophobic coating by the condensation method as in Example 4. The observed mean sizes of the agglomerates were plotted against the amount of dodecane, expressed as a volume fraction of the total volume of sand and dodecane. The results are shown in FIG. 1, from which it can be seen that equilibrium agglomerate sizes increased with the hydrocarbon volume fraction up to a volume fraction approaching 0.36 which corresponds to randomly close packed solid particles with the spaces between them filled with hydrocarbon. Moreover, there was little or no difference between the results observed with the two different methods of applying the hydrophobic $C_{10}F_{17}H_4$-silyl groups to the surface of the sand particles.

A conclusion which can be drawn here is that significant agglomeration can be brought about with a quantity of binding liquid which is a fairly small percentage of the quantity of particulate hm-sand.

Example 6B

Figure 2:
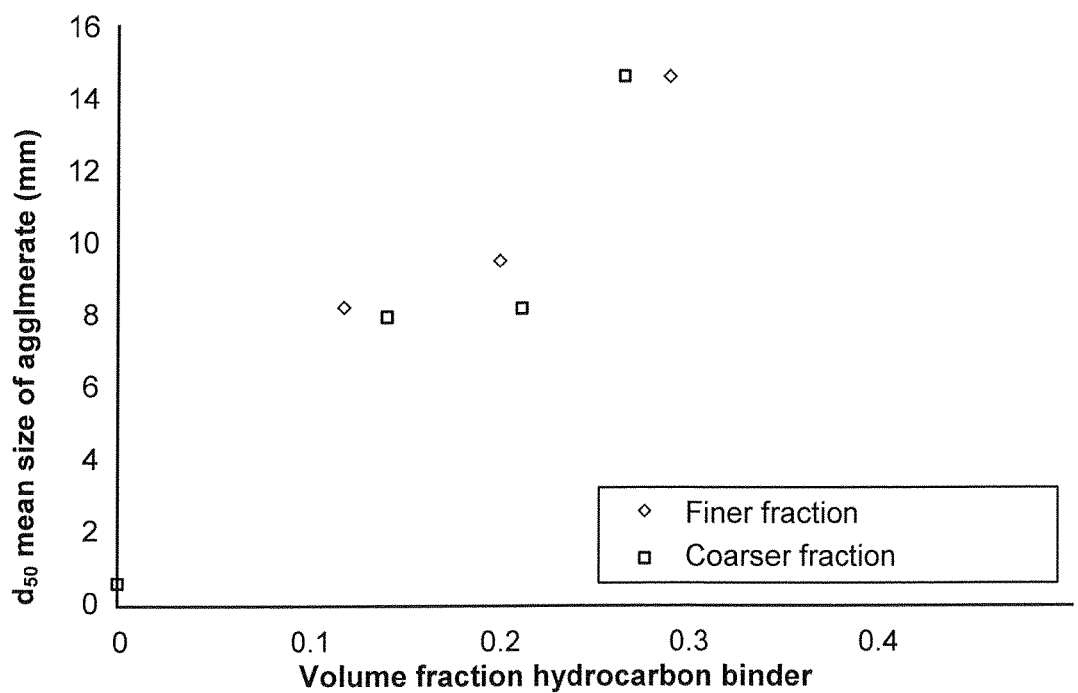
FIG. 2 shows similar plots with two sizes of particulate solid.
Figure 3:
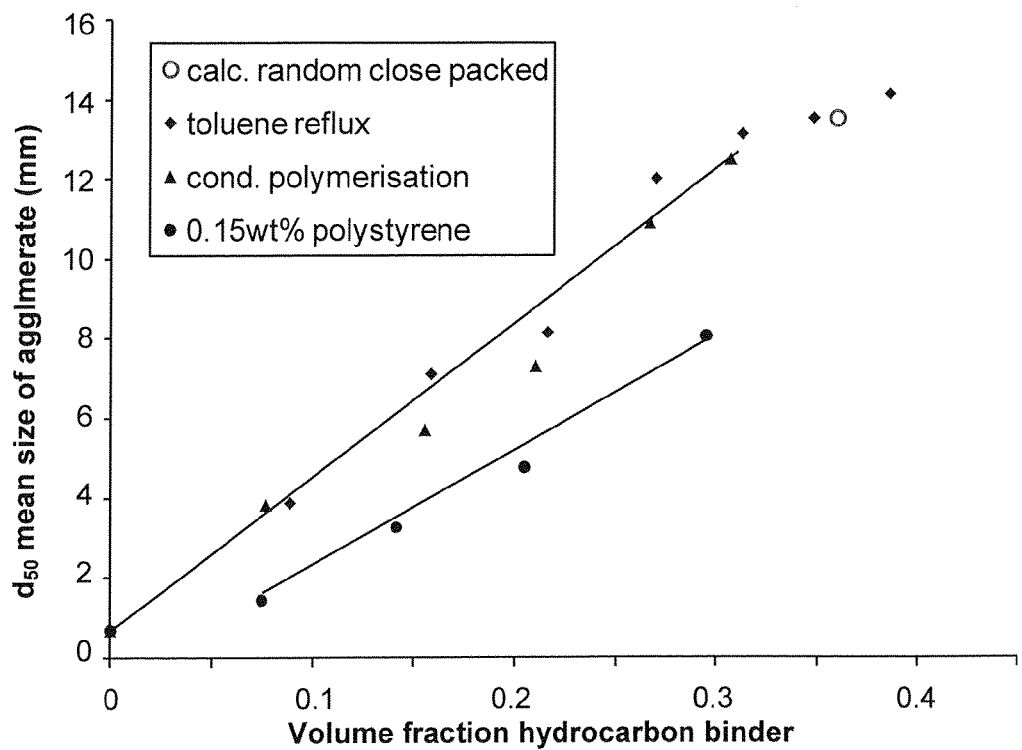
FIG. 3 shows similar plots with several types of hydrophobically modified sand.

The procedure of Example 6A was extended to samples of 20/40 sand coated with polystyrene as in Example 5. The results, together with results from Example 6A, are shown in FIG. 2. For each coating material the mean agglomerate sizes increased with volume fraction of dodecane, but the results with the polystyrene coating, which is less hydrophobic, lie on a line of lesser slope. Agglomeration of sand coated with polymethylmethacrylate in Example 5 was also attempted, but this material is only just sufficiently hydrophobic to be agglomerated and the agglomerates contained so much oil as to be oil droplets with grains of coated sand at the oil-water interface.

Example 7

Varying Particle Size 20 ml deionised water was placed in each of two sample bottles. 2 gm of 20/40 hm-sand (made by the condensation method as in Example 4) was then placed in one bottle. Into the other bottle was placed 1.4 gm of this 20/40 hm-sand and 0.6 gm 70/140 hm-sand (also made as in Example 4). 0.17 gm dodecane was added to each bottle. After 1 minute vigorous mixing, both bottles were seen to contain a single hm-sand agglomerate.

The agglomerate formed from the mixture of 20/40 and 70/140 hm-sands appeared to contain an intimate mixture of particles of the two sizes. It was observed on further shaking that this agglomerate was noticeably stronger than the agglomerate formed entirely from 20/40 sand. This indicates that smaller particles fit between the larger particles and the increase in interfacial area between particles and binding liquid serves to strengthen the agglomerate.

Example 8

Varying Particle Size 37.5 g of 20/40 sand and 37.5 g of 70/140 sand were mixed and treated with heptadecafluoro-tetrahydro-decyl-triethoxysilane (0.27 g) using the toluene reflux method as in Example 1. After treatment, the resulting 75 g of hm-sand was split into two distinct particle size fractions using a 45 mesh sieve. Thus the coarser fraction lay between 20 and 45 mesh sieve sizes and the finer fraction between 45 and 140 mesh sieve sizes.

Sample quantities of each size fraction were agglomerated using varying amounts of dodecane, as in Example 6A. The results are shown in FIG. 2 from which it can be seen that each of the fractions can be oil agglomerated and that the size of the agglomerates was dependent on the volume fraction of binding liquid (as observed in Example 6A) and independent of the particle size of the solid.

Sample quantities of the two size fractions were mixed back together and agglomerated with dodecane. The resulting agglomerates were observed to contain an intimate mixture of the two particle size ranges.

Example 9

Effects of Viscosity of Binder Liquid

Figure 4:
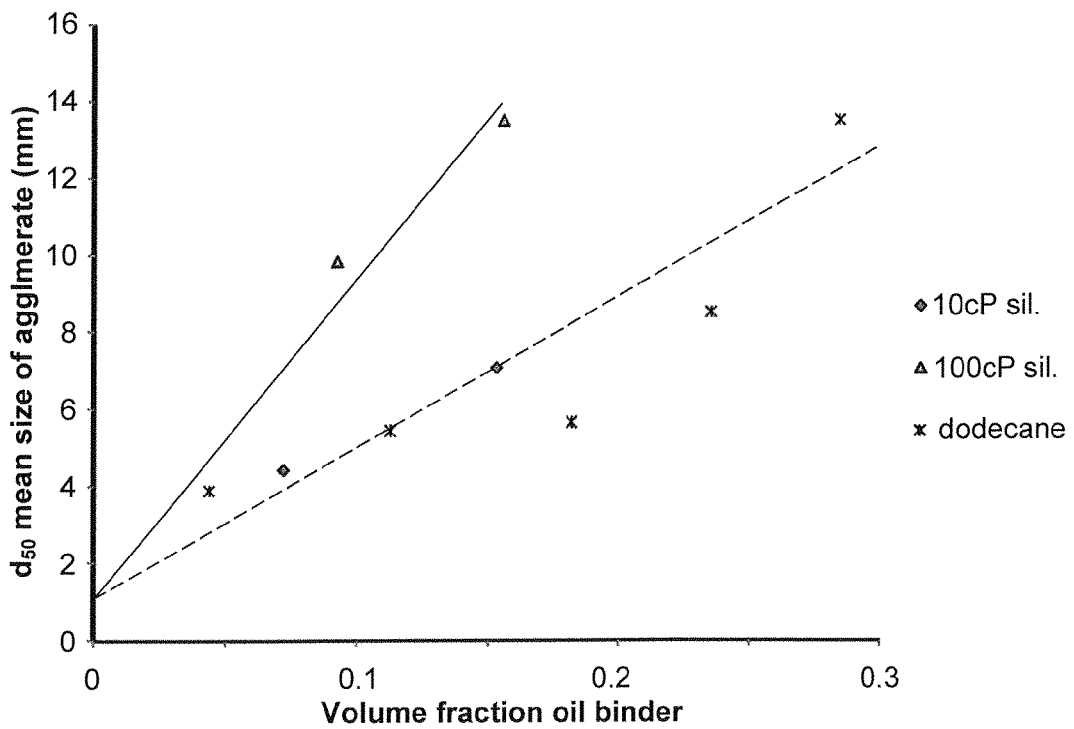
FIG. 4 shows similar plots with several viscosities of silicone oil as binding liquid.

The procedure of Example 6A was also carried out using silicone oils (polydimethylsiloxanes) of different viscosities (10 cP, and 100 cp). The results are shown in FIG. 4 which also shows some agglomerates obtained with dodecane. It can be seen that the agglomerate sizes obtained with 10 cP silicone oil were similar to those obtained with dodecane and a plot of size against volume fraction of oil is indicated as a broken line. The size of the agglomerates obtained with the more viscous 100 cp oil increased more rapidly with the volume fraction of binder liquid as shown by a full line, thus indicating that agglomerate size can be increased by viscosity of the binding liquid as well as the volume fraction of the liquid. It may be noted that the point with a 0.15 volume fraction of 100 cP silicone oil was a single large agglomerate of all the hm-sand present in the sample bottle. A similar agglomerate of all the hm-sand present was also obtained using the same volume fraction of 1000 cP oil.

Example 10

Effects of Temperature and of High pH 2 gm quantities of 20/40 sand, hydrophobically modified with $C_{10}F_{17}H_4$-silyl groups as in Example 1A, were placed in sample bottles together with 20 ml deionised water and varying amounts of dodecane. The bottles were shaken vigorously for one minute and then left for one hour at a chosen temperature to equilibrate. After this time, each sample was inspected to see whether the solid was agglomerated by the oil. For some experiments the deionised water was replaced with a pH12 buffer solution and the samples were kept for 3 days at 120° C. The results are set out in the following table in which +and − signs indicate that agglomeration was or was not observed.

| Hydrophobic groups | Deionised water, after 1 hour | | | | | pH 12, after 3 days |
|---|---|---|---|---|---|---|
| | 25° C. | 60° C. | 80° C. | 100° C. | 120° C. | 120° C. |
| $C_{10}F_{17}H_4$-silyl (Ex1A) | +* | + | + | + | + | + |
| $C_8F_{13}H_4$-silyl (Ex1A) | + | + | + | + | + | + |
| $C_{18}H_{37}$-silyl (Ex1A) | + | + | + | + | + | + |
| $C_{18}H_{37}$-aminopropylsilyl (Ex1A) | + | + | + | + | + | |
| $C_{10}F_{17}H_4$-silyl (num. Ratio 85.8 Ex 1B) | + | + | + | + | + | |
| $C_{10}F_{17}H_4$-silyl (num. Ratio 6.4 Ex 1B) | − | − | − | − | − | |
| $C_{10}F_{17}H_4$-silyl (Ex4) | + | + | + | + | + | + |
| $C_8F_{13}H_4$-silyl (Ex4) | + | +* | + | + | + | + |
| $C_{18}H_{37}$-silyl (Ex4) | + | + | + | + | + | + |
| 0.5 gm PS (Ex5) Tg = 67° C. | + | + | − | − | − | − |
| 0.15 gm PS (Ex5) Tg = 67° C. | + | + | − | − | − | − |

It can be seen from the table above that the procedure of Example 1B using only 0.02 gm organo-silane did not give a sufficiently hydrophobic surface to allow agglomeration to occur at all. Sand which had been hydrophobically modified with larger quantities of organo-silane as described in Example 1 gave agglomerates which were not affected by temperature up to 120° C. This was also true of the sand which had been given a hydrophobic coating in accordance with Example 4.

The agglomerates of sand with a polystyrene coating (Example 5) did not survive heating to 80° C. or above. This was attributed to the coating losing its integrity when heated above the polymer's glass transition temperature. In all cases where the agglomeration survived heating to 120° C. in deionised water, it also survived three days in pH12 alkaline buffer at this temperature.

Example 11

Effect of Temperature 3 gm hm-sand prepared as in Example 4 was added to 30 ml water, after which 260 mg 500 cP silicone oil was added, all at room temperature. The mixture was then vortex-mixed for 60 seconds, giving aggregates which appeared on visual inspection to be uniform in size. The sample was then immersed in a 80° C. heating bath for 5 minutes. After heating, the agglomerates in the sample were observed to be fewer in number and larger in size. This process was reversible with mild agitation upon cooling.

Example 12

Agglomeration with Eicosane

Figure 5:
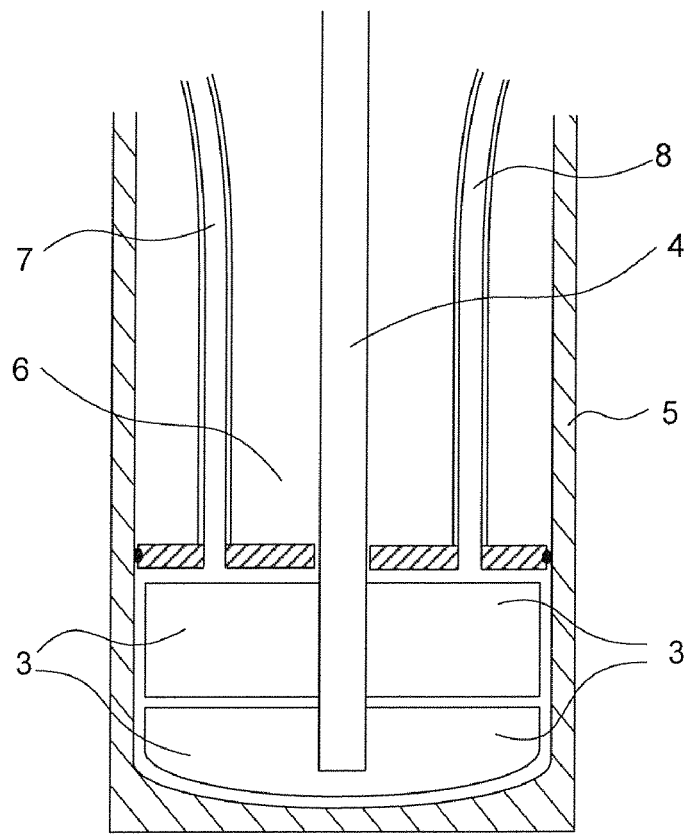
FIG. 5 is a cross-sectional view of apparatus used in experiments.

Eicosane ($C_{20}H_{42}$) is solid at room temperature and melts at 35-37° C. A series of experiments were carried out using this material in its liquid state as the binding liquid. The experiments were performed in a cylindrical vessel shown schematically in FIG. 5. An impeller with planar vertical blades 3 on a central vertical shaft 4 was located in a lower portion of the vessel 5 and driven by a Heidolph mechanical stirrer above the vessel. The impeller blades were dimensioned and positioned to sweep close to the vessel's base and walls so that when the impeller was rotated it created high shear within a swept volume of about 100 ml in the lower portion of the vessel 5. An apertured plate 6 encircled by an O-ring was a push fit within the vessel, and was positioned immediately above the swept volume during high shear stirring, so that no vortex could form. Tubes 7, 8 for water inlet and outlet led to apertures in the plate 6.

A standard procedure was used for the experiments. 100 ml deionised water (pH 6.5) was placed in the vessel 5 together with 20 gm of hm-sand and the desired amount of solid eicosane ($C_{20}H_{42}$; Aldrich; m. p. 37° C.). With the apertured plate 6 in place, the contents of the vessel were agitated vigorously by running the impeller at 500 RPM. While agitation continued, heating was then applied using a hot plate. Agitation was continued for 5-7 minutes while the vessel was heated on the hot plate to bring the contents of the vessel to a temperature of 50° C. During heating, the solid particles of eicosane melted to form a liquid oil binder phase which induced agglomeration of the hm-sand particles even under the prevailing high shear conditions. (It will be appreciated that this demonstrates the feasibility of using a difference between surface and downhole temperature to delay agglomeration until the composition experiences a higher temperature downhole).

In the experiments described here, the next step was to cool the contents of the vessel very rapidly, so as to solidify the agglomerates for further study by solidifying the eicosane in them. Rapid cooling to a temperature of 5-10° C. was achieved by pumping 200-300 ml of ice-cold water into and through the vessel 5 via the tube 7. This rapidly cooled the contents of the vessel and flushed the contents out through the tube 8 into a beaker. Both the size and structure of the aggregates formed under conditions of high shear and elevated temperature is "frozen" by this rapid cooling step. Excess water was decanted off and the agglomerates were transferred to a filter paper where they were allowed to dry in air for 12 hours.

The agglomerates were then sieved on a standard sieve corresponding to the upper size boundary of the hm-sand. The weight $W_a$ of agglomerates was taken as the dry weight of particles retained on this sieve. For example if the hm-sand had been made from 20/40 sand, $W_a$ was taken as the dry weight of recovered material retained on a 20 mesh sieve. The total weight of the original feed of solids i.e. the total weight of hm-sand and eicosane was denoted $W_f$ and the agglomeration efficiency was then given by the formula:

$$\text{Agglomeration efficiency} = \frac{W_a}{W_f} \times 100\%$$

Figure 6:
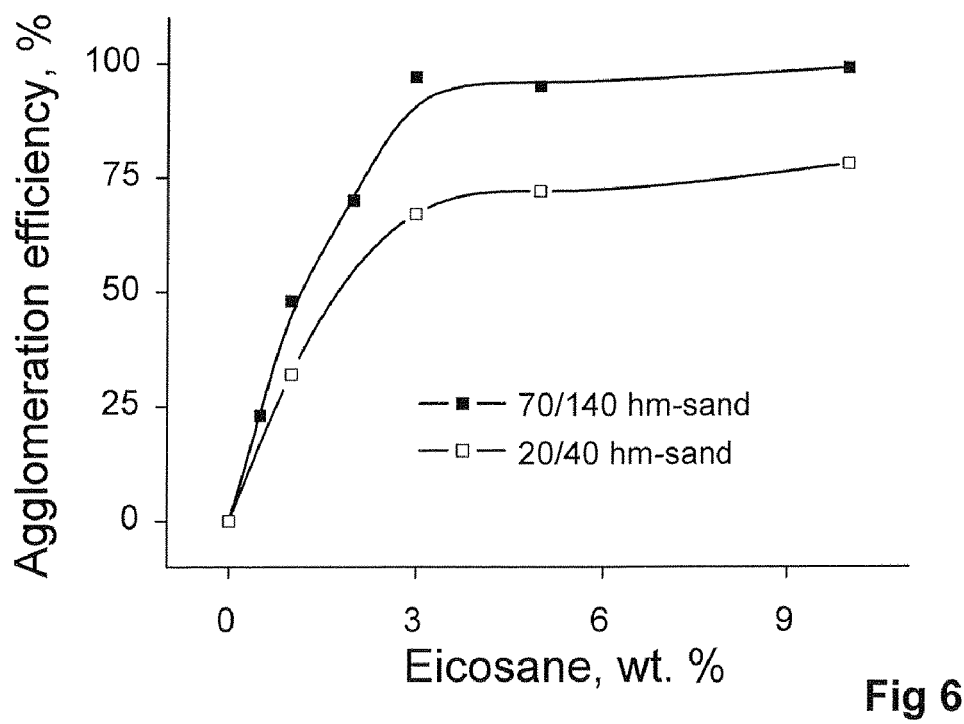
FIG. 6 plots agglomeration efficiency against the weight of eicosane.

A number of these experiments were carried out using hm-sand made from 20/40 sand and hm-sand made from 70/140 sand. The amount of eicosane was varied from 0.1 to 10 wt % based on the weight of hm-sand. Plots of agglomeration efficiency against the weight of eicosane are shown as FIG. 6. In general, the agglomeration efficiency increased with increasing eicosane concentration. As can be seen, the steepest increase in agglomeration efficiency was in the low eicosane concentration range 0-3 wt. %. Agglomeration of 70/140 hm-sand reached a plateau in the range 98-99% agglomeration efficiency with eicosane concentration 4 wt %. By contrast, the maximum agglomeration efficiency for the 20/40 hm-sand was 76% at 10 wt. % eicosane.

Example 13

Figure 7:
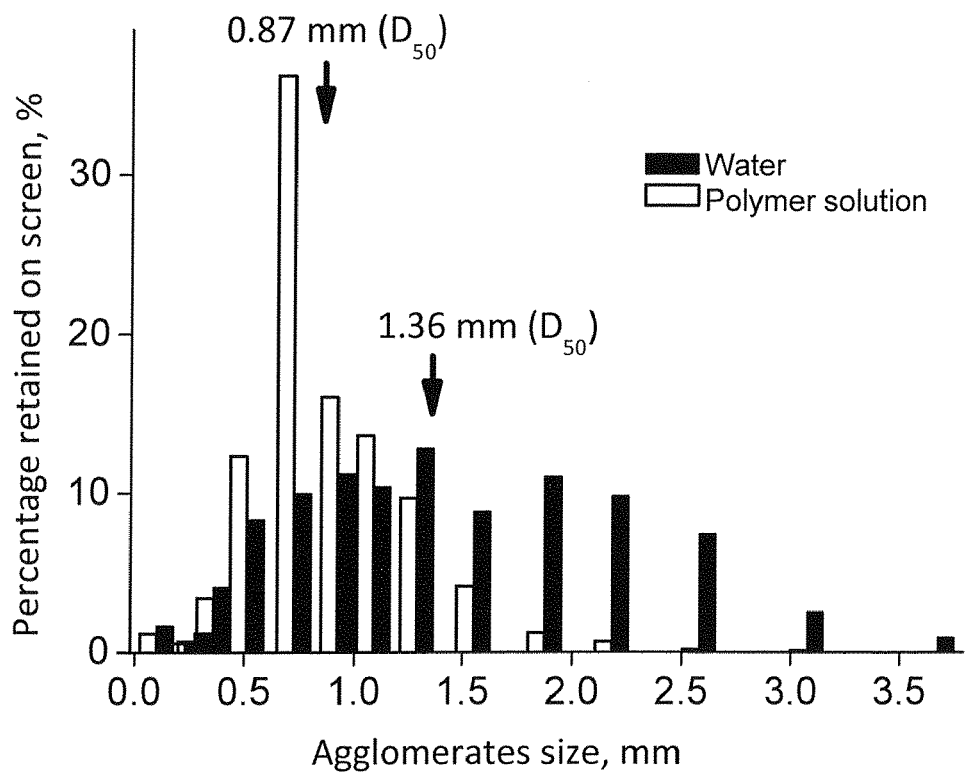
FIGS. 7 and 8 show particle size distributions of agglomerates.

In additional experiments (employing 5 wt % eicosane by weight of sand in the procedure given in the previous Example) the agglomerates formed from the 70/140 hm-sand after rapid cooling under high shear conditions were separated into 10 different size factions using a series of sieves. The experiment was carried out using deionised water as the carrier fluid as in the previous example, but then repeated using a viscous polymer solution (2.4 g/liter linear guar dissolved in deionised water) as the carrier fluid. The resultant agglomerate size distributions are shown in FIG. 7. It can be seen that agglomeration took place successfully in the viscous carrier fluid, but the particle size distribution is narrower and the median particle size is smaller.

Example 14

Figure 8:
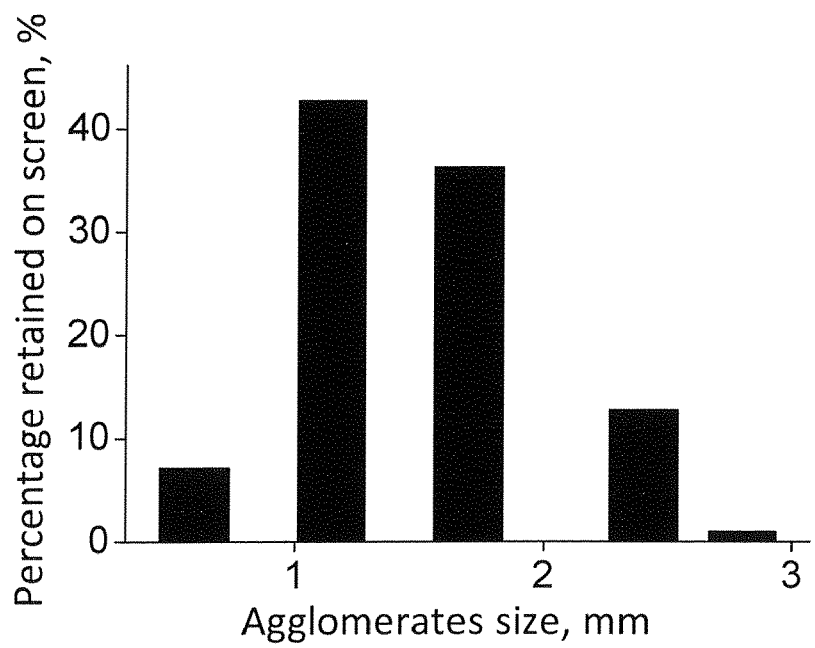

The procedure of Example 12 was repeated, using 20/40 resin coated proppant particles in place of hm-sand. Agglomeration took place, with an agglomeration efficiency of 93%. The agglomerates were sieved into five particle size ranges and the particle size distribution is shown as FIG. 8.

Example 15

Oleic Acid as Binding Liquid

A series of sample bottles was used. In each bottle a 2 gm sample quantity of sand, hydrophobically modified with $C_{10}F_{17}H_4$-silyl groups as in Example 1A was added to 20 ml deionised water containing 0.97 wt % potassium oleate (sufficient to convert to 0.22 ml oleic acid at low pH). The potassium oleate in water alone gave a fairly strongly alkaline pH of 11.3. The pH in a number of bottles was reduced by adding hydrochloric acid. The pH value and a description of the observed content of each bottle is given in the following table:

| pH | Content of bottle |
|---|---|
| 11.3 | Solid not agglomerated. Liquid appeared clear |
| 9.3 | Solid not agglomerated. Liquid slightly turbid |
| 7.1 | Solid not agglomerated. Liquid appeared cloudy |
| 6.0 | Solid not agglomerated. Liquid appeared cloudy |
| 5.1 | Solid agglomerated. Liquid appeared very slightly turbid |
| 2.9 | Solid agglomerated. Liquid appeared clear. |
| 2.0 | Solid agglomerated. Liquid appeared clear |

Example 16

Curable Binding Liquid 6 gm sand hydrophobically modified with $C_{10}F_{17}H_4$-silyl groups as in Example 1A was combined with 30 ml water and 0.5 gm 200 cP silicone oil and vortex-mixed to give aggregates of apparently uniform size. 150 mg poly(methylene-bis-phenylenediisocyanate) (BASF Lupranate M-20 PMDI) was added and the mixture was vortex-mixed for another 60 seconds. The resulting agglomerates were darker in colour indicating incorporation of the dark brown polyisocyanate. After standing for 5 minutes, the agglomerates were recovered by filtration using a Buchner funnel, and they appeared to retain their size and shape. These agglomerates were slightly firm to the touch, but could be crushed using a spatula.

The experiment was repeated without the silicone oil and using 500 mg Lupranate M-20 as the exclusive oil to form agglomerates. These agglomerates, when recovered, were noticeably stronger than those formed previously with silicone oil and only 150 mg of the Lupranate M20. In a control experiment, ordinary unmodified sand was used. Lupranate M-20 PMDI did not agglomerate this sand.

This experiment was also repeated with pure monomeric methylene-bis-phenylenediisocyanate (BASF Lupranate MP-102 MDI) with similar results.

Example 17

To 30 ml water were added 3 gm sand hydrophobically modified with $C_{10}F_{17}H_4$-silylgroups as in Example 1A and 500 mg Pripol 2033, an aliphatic polyalcohol. After 60 seconds of vortex mixing, the sand formed a few large agglomerates. 160 mg Lupranate M-20 was then added and the sample was mixed on the vortex mixer for 60 seconds. One large agglomerate resulted. After resting for 15 minutes this agglomerate was no longer deformable. It had a rubbery and extremely resilient nature.

Example 18

To 30 ml water were added 3 gm sand hydrophobically modified sand with $C_{10}F_{17}H_4$-silyl groups as in Example 1A and 500 mg 200 cP silicone oil. The sample was agitated for 60 seconds, giving agglomerates of apparently uniform size. A thin rod was wrapped with PTFE tape and used as a probe. When this probe was dipped in the sample, agglomerates that came into contact with the PTFE surface were observed to bind to it sufficiently strongly that they could be pulled entirely out of the solution, whereupon they became disorganized and dripped down the probe.

Example 19

Hydrophobic Modification and Agglomeration of Mica

Mica (muscovite of mean particle size 150 micron) was hydrophobically modified with heptadecafluoro-1,1,2,2-tetrahydro-decyl-triethoxy silane as in Example 1. 0.5 gm quantities of this hydrophobically modified mica were placed in bottles containing 20 ml deionised water. 1 ml hexadecane was added to one bottle and 2 ml hexadecane was added to a second bottle. A third bottle which provided a control did not receive any hexadecane. The bottles were shaken and then left to stand. In the bottle which received 1 ml hexadecane, the solid material clumped together as a layer at the bottom of the bottle which was bulkier and more uneven than the layer at the bottom of the control bottle. In the bottle which received 2 ml hexadecane most of the solid material again agglomerated, and in addition floated in the organic layer above the water layer.

Example 20

Hydrophobic Modification and Agglomeration of Glass Fibres

Glass fibres (mean length 20 mm, diameter 18 micron) here given a hydrophobic coating by a condensation polymerization of tetraethylorthosilicate (TEOS) and tridecafluoro-1,1,2,2-tetrahydro-octyl-triethoxysilane in 3:1 molar ratio under basic conditions. 100 gm glass fibre, 20 ml of aqueous ammonia ($NH_4OH$, 28%), 142.5 ml of absolute ethanol and 7.5 ml deionized water were mixed and stirred gently for 30 min. Then 0.368 gm (1.26 mmol) of TEOS and 0.3 gm (0.58 mmol) tridecafluoro-1,1,2,2-tetrahydro-octyl-triethoxysilane were added and stirred for 2 hrs at room temperature. The resulting hm-fibres were then filtered off, washed with ethanol and then with deionized water and dried at 120° C. overnight.

2 gm of these hm-fibres were placed in a bottle containing 20 ml deionised water. As a control, 2 gm of unmodified fibres were placed in a second bottle, also containing 20 ml deionised water. 2 ml dodecane was added to each bottle. The bottles were shaken vigorously and then left to stand. The hm fibres formed an agglomerated mass floating at the top of the water phase and all the dodecane associated with this. In the control bottle the dodecane formed a layer on top of the water layer and the fibres remained suspended in the water phase beneath.

Example 21

Hydrophilic Agglomerates 20 ml dodecane and 1 gm of unmodified 20/40 sand were placed in a sample bottle and shaken. The sand did not agglomerate. 1 ml water was then added. The sand was observed to agglomerate, although the agglomerates which formed were not so rounded as the hydrophobic agglomerates formed in Examples 1A, 2 and 3.

Figure 9:
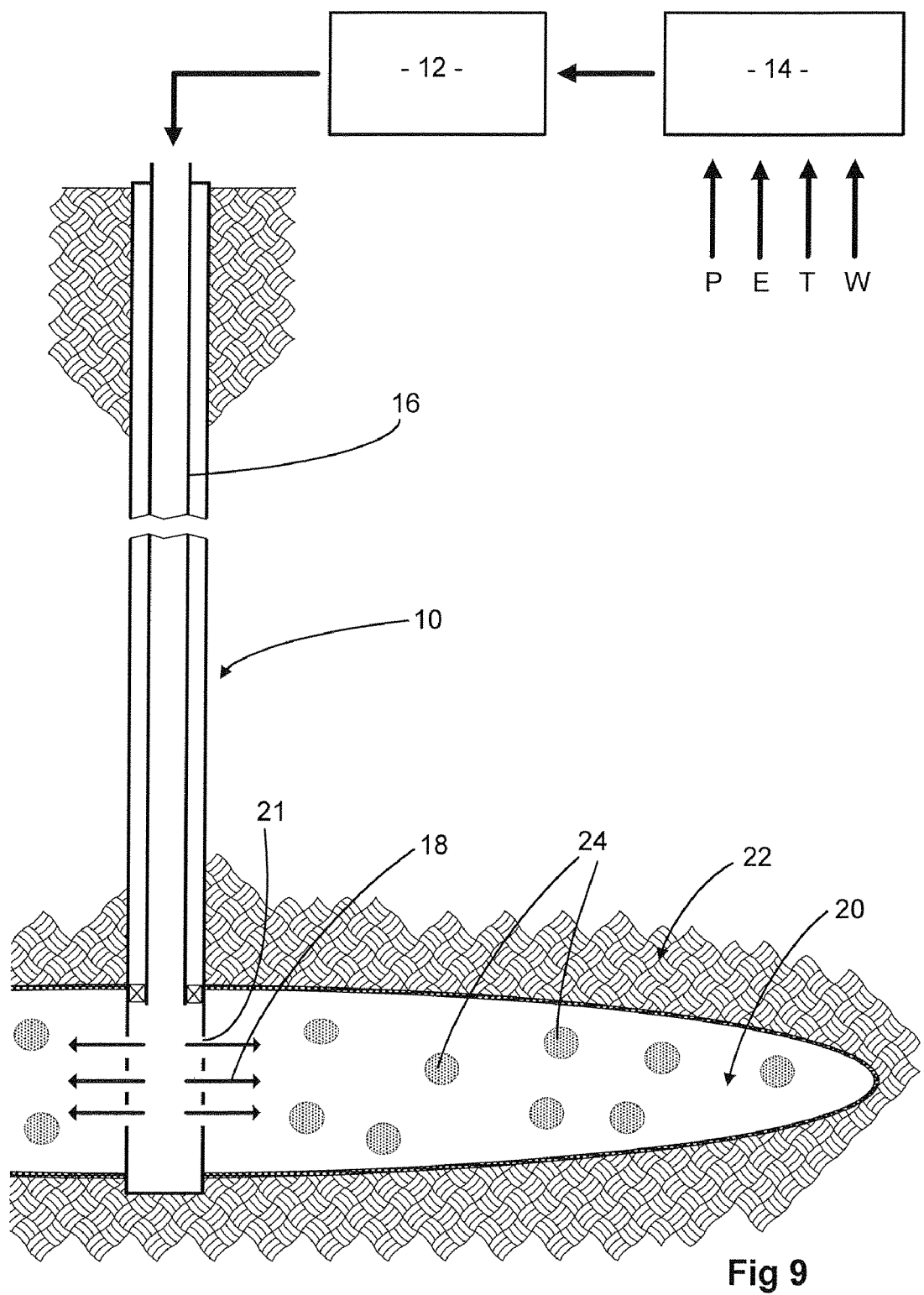
FIGS. 9 to 11 schematically illustrate the use of some embodiments of the invention.

To illustrate and exemplify use of some embodiments of the method of this invention, FIG. 9 shows diagrammatically the arrangement when a fracturing job is carried out. As is conventional for such a job, hydrocarbon production from an existing wellbore 10 is halted and the well head is coupled to pumps 12 supplied by a mixer 14. This mixer is supplied with guar gum as a thickening polymer T, water W and (when required) particulate solid P and eicosane E as indicated by arrows W, P, E and T. The mixer makes an aqueous solution of the guar which is a viscous fracturing fluid and serves as carrier liquid for the particulate solid P and eicosane E. This fluid formed by mixing in the mixer 14 is pumped down the production tubing 16 within the wellbore 10 and exits through perforations 21 into the reservoir formation 22 as indicated by the arrows 18 at the foot of the well, at a pressure which is sufficiently great to initiate and propagate a fracture 20 in the formation 22. In the early stages of the fracturing job, the fluid does not contain solid nor eicosane and elongates the fracture, but later on particulate solid and eicosane are mixed with the fluid which is being pumped in. The solid is hydrophobically modified sand such as described in Example 1 having particle size ranging from 425 to 840 micron (20 to 40 US sieve). The composition is subjected to shear as it passes through perforations 21. The, once it has entered the fracture 20, its temperature increases to that of the reservoir formation 22. The eicosane melts and agglomerates the hm-sand to form pillars 24 of proppant which extend across the fracture 20.

The same equipment could of course be used if the binding liquid was encapsulated or was provided by a precursor material which undergoes chemical change downhole to become the actual binding liquid.

Figure 10:
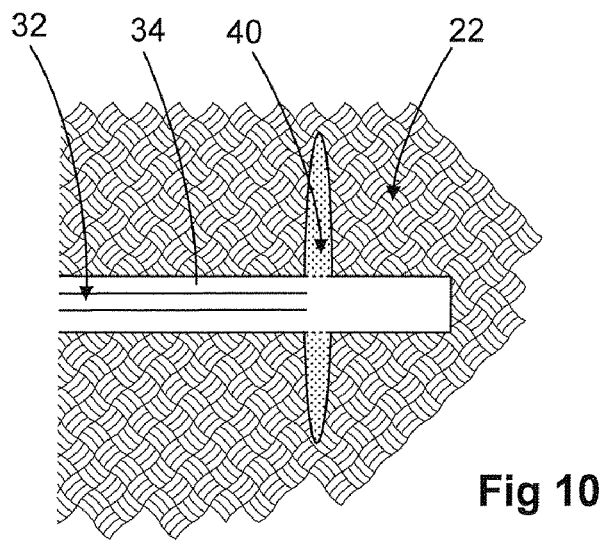

FIG. 10 illustrates the use of coiled tubing 32 within a wellbore (here a horizontal wellbore) to separate two paths of flow which are the interior of the tubing 32 and the annulus 34 around it. In this illustration, the coiled tubing 32 is being used when forming a fracture 40. Aqueous thickened fracturing fluid in which hydrophobically modified sand is suspended is delivered via the annulus 34 around the tubing, while an aqueous thickened fluid in which a binding liquid is suspended is delivered along the coiled tubing 32. The streams mix at the exit from the coiled tubing and enter the fracture 40 where the binding liquid agglomerates the hm-sand to form pillars of proppant within the fracture.

A somewhat similar approach might be used to separate two reactive binding liquids. The coiled tubing 32 could carry aqueous thickened fluid with hm-sand and a first binding liquid while the annulus 34 carries aqueous thickened fluid with hm-sand and a second binding liquid. The two binding liquids are able to react together when they mix at the exit from the tubing 32 and enter the fracture 40.

Figure 11:
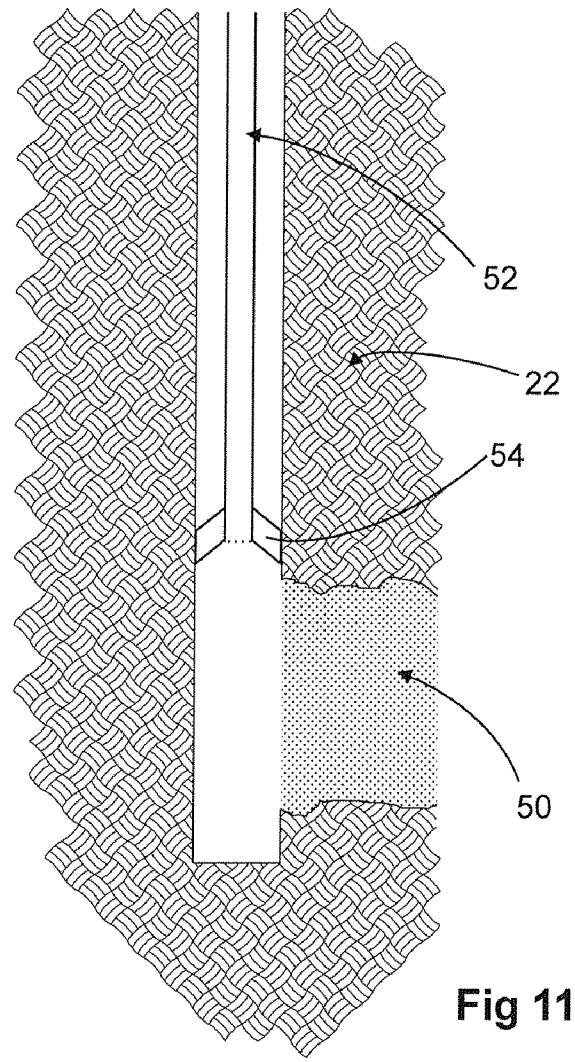

FIG. 11 illustrates the plugging of a natural cavity 50 which has been encountered when drilling formation 22. The drill string 52 is used to supply an aqueous fluid in which are suspended hm-sand and a binding liquid (at a greater concentration than for hydraulic fracturing). Some agglomeration may take place during flow down the drill string, but the mixture is able to pass through apertures in the drill bit 54 and enter the fracture where the solid and binding liquid agglomerate into a plug, blocking entry into the cavity. Reaction of the binding liquid then makes the agglomerated mass plugging the cavity 50 more rigid.

It should be appreciated that these FIGS. 9, 10 and 11 are only schematic illustrations of possible applications of this invention. Variations and other possible applications will be apparent from the preceding text.

The invention claimed is:

1. A method of delivering solid material below ground, comprising supplying, underground, a composition comprising a carrier liquid in which there are suspended a binding liquid and a particulate solid, the binding liquid and the particulate solid being similar to each other but opposite to the carrier liquid in hydrophilic/hydrophobic character such that agglomerates of the solid particles held together by the binding liquid are formed by agglomeration below ground.

2. A method according to claim 1 wherein the carrier liquid is aqueous and the binding liquid and the particulate solid are both hydrophobic.

3. A method according to claim 2 wherein the binding liquid has a surface tension which is no greater than 30 mN/m.

4. A method according to claim 2 wherein the particulate solid has an agglomeration limit surface tension as defined herein not greater than 40 mN/m.

5. A method according to claim 1 wherein the carrier liquid is non-aqueous and hydrophobic and the binding liquid and the particulate solid are both hydrophilic.

6. A method according to claim 1 including delivering the carrier liquid, binding liquid and particulate solid via a wellbore to the subterranean location.

7. A method according to claim 6 wherein delivery via the wellbore includes passage through a place where the extent of shear is more than in the preceding part of the wellbore and more than at the subterranean location.

8. A method according to claim 6 wherein the binding liquid and/or the particulate solid are delivered via the wellbore in such a manner as to prevent agglomeration within the wellbore but allow agglomeration to take place at the subterranean location.

9. A method according to claim 6 wherein the binding liquid and the particulate solid are transported separately down the wellbore so that they contact each other downhole.

10. A method according to claim 9 wherein the binding liquid or the particulate solid are transported down the wellbore within coiled tubing.

11. A method according to claim 6 wherein the binding liquid has a melting point such that it is solid at surface temperature but melts to liquid form at the temperature of the subterranean location.

12. A method according to claim 6 wherein the binding liquid or the particulate solid is delivered via the wellbore as a precursor which is converted to the binding liquid or particulate solid at the subterranean location.

13. A method according to claim 12 wherein the binding liquid is delivered via the wellbore as a viscoelastic surfactant which thickens the carrier liquid until it becomes converted to the carrier and binding liquid at the subterranean location.

14. A method according to claim 6 wherein the binding liquid or the particulate solid is delivered via the wellbore in encapsulated form and released therefrom at the subterranean location.

15. A method according to claim 6 including providing at the subterranean location a fixed surface which is similar to the binding liquid and the particulate solid in hydrophilic/hydrophobic character so that the agglomerates adhere to the said surface.

16. A method according to claim 1 wherein the particulate solid has a hydrophobic surface coating.

17. A method according to claim 1 wherein the binding liquid undergoes polymerisation after the agglomeration has taken place.

18. A method according to claim 17 wherein two or more of the binding liquids are chemically reactive with each other.

19. A method according to claim 1 including delivering two or more separate compositions to the subterranean location via respective separate flow paths within the wellbore, each said composition comprising a carrier liquid, binding liquid and particulate solid.

20. A method of manipulating a subterranean flow path comprising providing a composition within said flow path comprising a carrier liquid in which there are suspended a binding liquid and a particulate solid which is insoluble in both the carrier and binding liquids, the binding liquid and the particulate solid being similar to each other but opposite to the carrier in hydrophilic/hydrophobic character, and causing or allowing agglomeration by the binding liquid to provide agglomerates of the solid particles held together by the binding liquid within that flow path.

21. A method according to claim 20 wherein formation of agglomerates within the flow path blocks the flow path.

22. A method of fracturing a subterranean reservoir formation penetrated by a wellbore, comprising delivering a fracturing fluid via a well bore to the fracture, said fracturing fluid providing within the fracture:
    a binding liquid dispersed within the fracturing fluid, and
    a particulate solid suspended within the fracturing fluid,
        said solid being insoluble in both the fracturing fluid and the binding liquid,
the binding liquid and the particulate solid being similar to each other but opposite to the fracturing fluid in hydrophilic/hydrophobic character such that agglomeration of the solid by the binding liquid within the fracture forms deformable agglomerates therein comprising particles of the solid held together by the binding liquid, the proportions of the binding liquid, the particulate solid and the fracturing fluid being such that the agglomerates are spaced apart within the fracture with flow paths between them.

23. A method according to claim 22 wherein the binding liquid forms from a precursor after entering the wellbore.

24. A method according to claim 22 wherein the agglomerates are deformable when formed and are subsequently stabilised by polymerisation of the binding liquid.

* * * * *